United States Patent
Li et al.

(10) Patent No.: US 12,536,083 B2
(45) Date of Patent: Jan. 27, 2026

(54) OUT-OF-BAND MANAGEMENT METHOD FOR STORAGE APPARATUS, BASEBOARD MANAGEMENT CONTROLLER AND STORAGE APPARATUS

(71) Applicant: SAMSUNG ELECTRONICS CO., LTD., Suwon-si (KR)

(72) Inventors: Yufang Li, Xian (CN); Bumjun Kim, Xian (CN); Ning Li, Xian (CN); Jae-Sang Yun, Suwon-si (KR); Liu Yang, Xian (CN); Jaeheon Ma, Hwaseong-si (KR); Ran Tan, Xian (CN); Jisook Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 83 days.

(21) Appl. No.: 18/142,929

(22) Filed: May 3, 2023

(65) Prior Publication Data

US 2023/0393959 A1    Dec. 7, 2023

(30) Foreign Application Priority Data

Jun. 2, 2022  (CN) .......................... 202210626146.1

(51) Int. Cl.
*G06F 11/00* (2006.01)
*G06F 11/30* (2006.01)

(52) U.S. Cl.
CPC ...... *G06F 11/3034* (2013.01); *G06F 11/3058* (2013.01)

(58) Field of Classification Search
CPC .......................... G06F 11/3034; G06F 11/3058
See application file for complete search history.

(56) References Cited

U.S. PATENT DOCUMENTS

| | | | |
|---|---|---|---|
| 8,725,923 B1 * | 5/2014 | Frangioso | G06F 11/3082 710/306 |
| 10,156,987 B1 * | 12/2018 | Gutierrez | G06F 1/3268 |
| 10,445,283 B2 | 10/2019 | Velez et al. | |
| 10,671,560 B2 | 6/2020 | Brown et al. | |
| 10,896,142 B2 | 1/2021 | Osawa et al. | |
| 10,901,898 B2 | 1/2021 | Wu et al. | |
| 11,003,618 B1 | 5/2021 | Constantinides et al. | |
| 11,023,302 B2 | 6/2021 | Thornley et al. | |
| 2008/0005222 A1 | 1/2008 | Lambert et al. | |

(Continued)

FOREIGN PATENT DOCUMENTS

| | | |
|---|---|---|
| CN | 109032901 A | 12/2018 |
| CN | 109558371 A | 4/2019 |

(Continued)

OTHER PUBLICATIONS

Office Action in Chinese Appln. No. 202210626146.1, mailed on Dec. 14, 2023, 27 pages (with Machine translation).

*Primary Examiner* — Philip Guyton
(74) *Attorney, Agent, or Firm* — Fish & Richardson P.C.

(57) ABSTRACT

An out-of-band management method for a storage apparatus includes communicating with a micro controller unit of the storage apparatus by a baseboard management controller to obtain product information of the storage apparatus or status information of the storage apparatus and operating the storage apparatus by the baseboard management controller based on the obtained information.

15 Claims, 14 Drawing Sheets

(56) References Cited

U.S. PATENT DOCUMENTS

| | | | |
|---|---|---|---|
| 2012/0102580 A1* | 4/2012 | Bealkowski | G06F 21/86 |
| | | | 726/34 |
| 2012/0110389 A1* | 5/2012 | Chen | H04L 43/0817 |
| | | | 714/47.1 |
| 2014/0006603 A1* | 1/2014 | Yang | G06F 11/3055 |
| | | | 709/224 |
| 2014/0289570 A1 | 9/2014 | Lewis | |
| 2019/0004901 A1 | 1/2019 | Ryan et al. | |
| 2019/0042161 A1* | 2/2019 | Li | G06F 3/0659 |
| 2019/0187909 A1* | 6/2019 | Pinto | H04L 49/351 |
| 2019/0188003 A1* | 6/2019 | Morrison | G06F 9/4416 |
| 2020/0341926 A1* | 10/2020 | Tu | G06F 3/0632 |
| 2020/0371695 A1* | 11/2020 | Gopal | G06F 3/0658 |
| 2021/0397577 A1 | 12/2021 | Kahn et al. | |
| 2022/0129350 A1* | 4/2022 | Sharma | G06F 3/0619 |
| 2022/0164139 A1* | 5/2022 | Moshe | G06F 3/0688 |
| 2023/0384847 A1* | 11/2023 | Hur | G06F 1/30 |
| 2024/0028493 A1* | 1/2024 | Lee | G06F 11/3058 |
| 2024/0045765 A1* | 2/2024 | Kim | G06F 11/141 |
| 2024/0256159 A1* | 8/2024 | Lee | G06F 11/3058 |

FOREIGN PATENT DOCUMENTS

| | | |
|---|---|---|
| CN | 110058803 A | 7/2019 |
| CN | 111176967 A | 5/2020 |
| CN | 112667483 A | 4/2021 |

* cited by examiner

OUT-OF-BAND MANAGEMENT METHOD FOR STORAGE APPARATUS, BASEBOARD MANAGEMENT CONTROLLER AND STORAGE APPARATUS

CROSS-REFERENCE TO RELATED APPLICATION

This application is based on and claims priority under 35 U.S.C. § 119 to Chinese Patent Application No. 202210626146.1, filed on Jun. 2, 2022, in the Chinese Patent Office, the disclosure of which is incorporated by reference herein in its entirety.

TECHNICAL FIELD

The present disclosure relates to the storage field and, more specifically, to an out-of-band management method for a storage apparatus or a baseboard management controller and the storage apparatus.

BACKGROUND ART

Recently, a storage apparatus (such as a Solid State Drive (SSD), a Non-Volatile Memory Express (NVMe), an Embedded Multi-Media Card (eMMC), a Universal flash memory (UFS), etc.) has been widely used.

Typically, a storage apparatus may operate under the management of a host. The host is connected to the storage apparatus by an interface, so that an operating system of the host may operate the storage apparatus, which is an in-band management method in which the host manages the storage apparatus. The Baseboard Management Controller (BMC) on the host is also connected to the storage apparatus by the interface. The BMC communicates with the storage apparatus without using the operating system, which is an out-of-band management method in which the BMC manages the storage apparatus.

However, the out-of-band management function of the existing BMC for storage apparatus is limited and it is difficult to meet the needs of users.

SUMMARY

A purpose of the present disclosure is to provide an out-of-band management method of communication for a storage apparatus, a baseboard management controller, and a storage apparatus.

According to one aspect of the present disclosure, an out-of-band management method of a storage apparatus is provided, the out-of-band management method comprises: communicating with a micro controller unit of the storage apparatus by a baseboard management controller to obtain at least one information of product information of the storage apparatus and status information of the storage apparatus; and operating the storage apparatus by the baseboard management controller based on the at least one information.

According to one aspect of the present disclosure, a baseboard management controller comprises: a communication unit configured to communicate with a micro controller unit of a storage apparatus to obtain at least one information of product information of the storage apparatus and status information of the storage apparatus; and an operation unit configured to operate the storage apparatus based on the at least one information.

According to one aspect of the present disclosure, an out-of-band management method of a storage apparatus comprises: monitoring status information of the storage apparatus by a micro controller unit of the storage apparatus; and communicating with a baseboard management controller by the micro controller unit to send at least one information of the status information of the storage apparatus and product information of the storage apparatus to the baseboard management controller.

According to one aspect of the present disclosure, a storage apparatus includes a micro controller unit configured to: monitor status information of the storage apparatus; store at least one information of the status information of the storage apparatus and product information of the storage apparatus; and transmit the at least one information to a baseboard management controller by communicating with the baseboard management controller.

In the out-of-band management method, the baseboard management controller and the storage apparatus according to the example embodiment of the present disclosure, the baseboard management controller may control the operation of the storage apparatus based on the information received from the micro controller unit, thus enhancing the management function of the storage device by the baseboard management controller (e.g., out-of-band management functions).

In the out-of-band management method, the baseboard management controller and the storage apparatus according to the example embodiment of the present disclosure, the baseboard management controller may communicate with the micro controller unit under abnormal conditions of the storage apparatus. Therefore, the control ability of the baseboard management controller to the storage apparatus may be improved when the storage apparatus is abnormal.

In the out-of-band management method, the baseboard management controller and the storage apparatus according to the example embodiment of the present disclosure, the baseboard management controller may communicate with the micro controller unit based on an internal integrated circuit bus or a system management bus. Therefore, the baseboard management controller may efficiently communicate with the micro controller unit.

In the out-of-band management method, the baseboard management controller and the storage apparatus according to the example embodiment of the present disclosure, since the micro controller unit may send at least one of the status information of the storage apparatus and the product information of the storage apparatus to the external baseboard management controller, the out-of-band management function for the storage apparatus is enhanced.

In the out-of-band management method, the baseboard management controller and the storage apparatus according to the example embodiment of the present disclosure, the micro controller unit may include a persistent memory used to store at least one of the status information of the storage apparatus and the product information of the storage apparatus. Therefore, at least one of the state information of the storage apparatus and the product information of the storage apparatus may be reliably stored in the micro controller unit.

In the out-of-band management method, the baseboard management controller and the storage apparatus according to the example embodiment of the present disclosure, the baseboard management controller may receive information from the micro controller unit by out-of-band management, so the ability to collect information from the storage apparatus is extended.

In the out-of-band management method, the baseboard management controller and the storage apparatus according to the example embodiment of the present disclosure, the baseboard management controller may control the operation of the storage apparatus based on the information received from the micro controller unit by out-of-band management, so the control ability of the storage apparatus is enhanced.

In the out-of-band management method, the baseboard management controller and the storage apparatus according to the example embodiment of the present disclosure, since a persistent memory for storing various information of the storage apparatus (e.g., at least one of vital product data, software information and hardware information of the storage apparatus) is set in the micro controller unit, the micro controller unit may send various information to the baseboard management controller by out-of-band management, so as to enhance and expand the out-of-band management capability of the storage apparatus.

In the out-of-band management method, the baseboard management controller and the storage apparatus according to the example embodiment of the present disclosure, the communication capability between the baseboard management controller and the micro controller unit may be enhanced by realizing the software communication protocol stack between the baseboard management controller and the micro controller unit, so that more messages and commands may be sent between them. By enhancing and expanding the out-of-band management ability of the baseboard management controller to the storage apparatus, the baseboard management controller may better monitor and manage the storage apparatus. For example, when the baseboard management controller detects an abnormal power failure of the host, the baseboard management controller may send a message to the storage apparatus by out-of-band management to make the storage apparatus take countermeasures. This may ensure data integrity and prevent data loss.

In the out-of-band management method, the baseboard management controller and the storage apparatus according to the example embodiment of the present disclosure, since the microcontroller is configured with a persistent memory to store any kind of information, the electrically erasable programmable read-only memory may be removed from the storage apparatus. Therefore, space on the main board of the storage apparatus is saved and the cost of the storage apparatus is reduced.

In the out-of-band management method, the baseboard management controller and the storage apparatus according to the example embodiment of the present disclosure, since one of the power supply unit and the standby power supply may be used to supply power to the micro controller unit, stable out-of-band management may be realized.

In the out-of-band management method, the baseboard management controller and the storage apparatus according to the example embodiment of the present disclosure, when the main controller of the storage apparatus is in an abnormal state and may not perform in-band communication, the baseboard management controller may communicate with the storage apparatus by the out-of-band management mode according to the example embodiment of the present disclosure. The baseboard management controller may obtain the information before and after the error of the main controller of the storage apparatus (for example, only as an example, hardware monitoring information, log information, etc.), and use the information for fault analysis, so as to quickly locate the cause of the fault and repair the fault. Accordingly, the baseboard management controller may effectively reduce the failure time and may greatly reduce the production loss and cost caused by storage equipment failure in industrial production.

In the out-of-band management method, the baseboard management controller and the storage apparatus according to the example embodiment of the disclosure, the internal hardware information of the storage apparatus may be collected by the baseboard management controller and stored in the persistent memory of the micro controller unit. Then, the baseboard management controller communicates with the micro controller unit by out-of-band management, which solves the problem that when the main controller of the storage apparatus is abnormal, the host may not monitor the internal hardware of the storage apparatus.

BRIEF DESCRIPTION OF THE DRAWINGS

The above and other objects and features of the present disclosure will become clearer by the following description in conjunction with the accompanying drawings showing an example, wherein.

DETAILED DESCRIPTION

Figure 1:
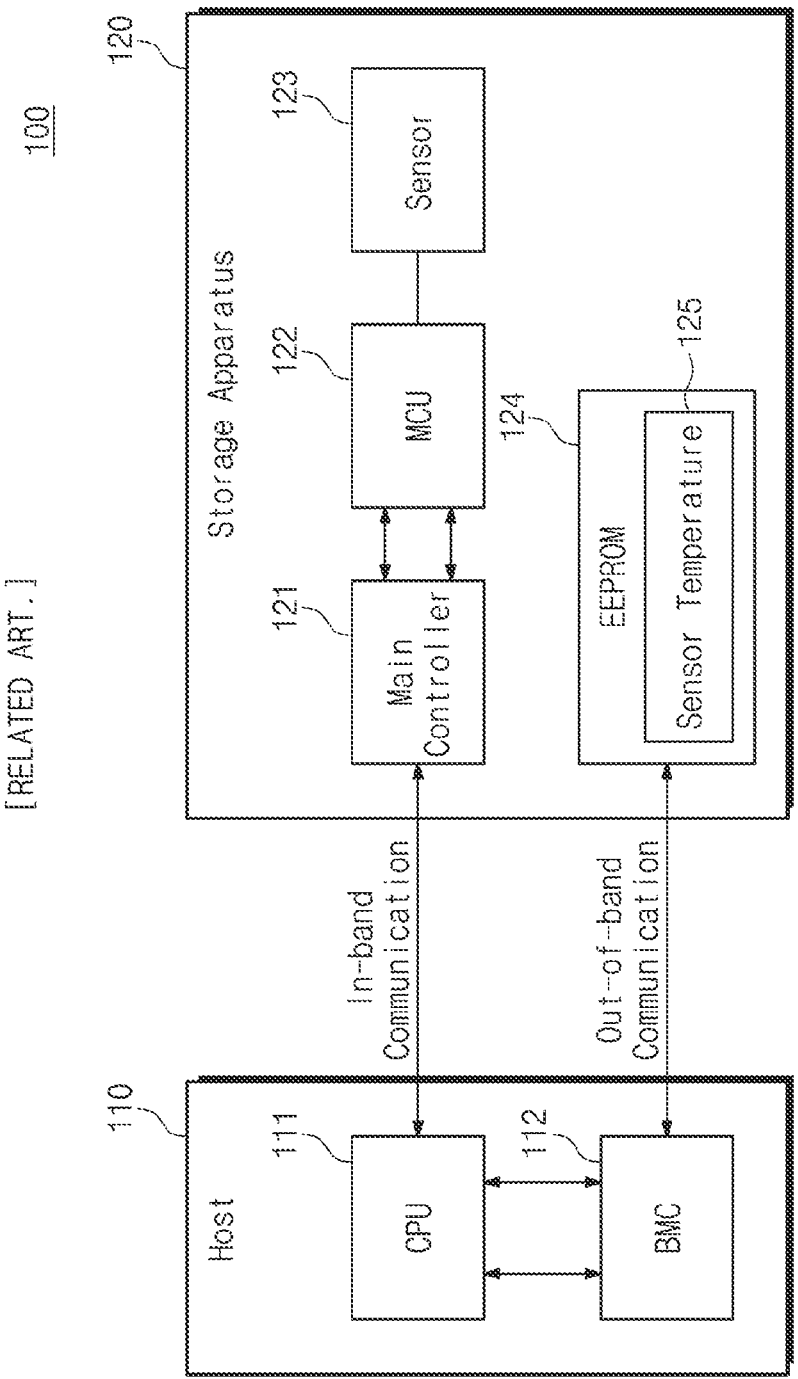
FIG. 1 shows a schematic diagram of communication between a host and a storage device in a storage system according to the Related Art.

FIG. 1 illustrates a schematic diagram of communication between a host and a storage apparatus in a storage system according to the Related Art.

Referring to FIG. 1, a host 110 and a storage apparatus 120 may be included in a storage system 100.

The host 110 may include a central processing unit (CPU) 111 and a baseboard management controller (BMC) 112. The CPU 111 and the BMC 112 may communicate with each other.

The storage apparatus 120 may include a main controller 121, a Micro Controller Unit (MCU) 122, a sensor 123, and an Electrically Erasable Programmable Read Only Memory (EEPROM) 124. The main controller 121 and the microcontroller unit 122 may communicate with each other. The micro controller unit 122 may receive sensing information of the sensor 123 from the sensor 123. As an example, the storage apparatus 120 may include a plurality of sensors 123. The sensors 123 may be integrated modules and may sense one or more parameters of the storage apparatus 120. For example, the sensor 123 may include, but is not limited to, a NAND voltage sensor, a Dynamic Random Access Memory (DRAM) voltage sensor, an external voltage sensor, a temperature sensor, a humidity sensor, and the like. The electrically erasable programmable read-only memory 124 may store information such as, but not limited to, Vital Product Data (VPD) information of the storage apparatus (e.g., basic information such as the serial number, model, etc. of the storage apparatus). The vital product data information of the storage apparatus 120 is once written into the electrically erasable programmable read-only memory 124 by the main controller 121 of the storage apparatus 120 when the storage apparatus 120 leaves the factory. After the vital product data information is written, it will not be changed, but may only be read. The electrically erasable programmable read-only memory 124 further includes a temperature sensor 125 for detecting the temperature of the electrically erasable programmable read-only memory 124 and records the detected temperature in the electrically erasable programmable read-only memory 124. The value of the temperature may be updated in real time as the temperature of the electrically erasable programmable read-only memory 124 changes.

The management of the storage apparatus 120 by the host 110 is divided into in-band management and out-of-band management. The in-band management of the storage apparatus 120 by the host 110 means that the host 110 communicates with the main controller 121 of the storage apparatus 120 through the central processing unit 111, the operating system, etc., and operates the storage apparatus 120. The host 110 monitors the status information of the storage apparatus 120 in the way of in-band management. The micro controller unit 122 transmits the relevant information obtained from the sensor 123 to the main controller of the storage apparatus 120, and the main controller 121 transmits the information to the host 110 by in-band management for use by the host 110 to monitor and manage the internal hardware state of the storage apparatus 120. The out-of-band management of the storage apparatus 120 refers to the process in which the baseboard management controller 112 of the host 110 is connected with the storage apparatus 120 by an interface and reads information from the electrically erasable programmable read only memory 124 of the storage apparatus 120.

Figure 2:
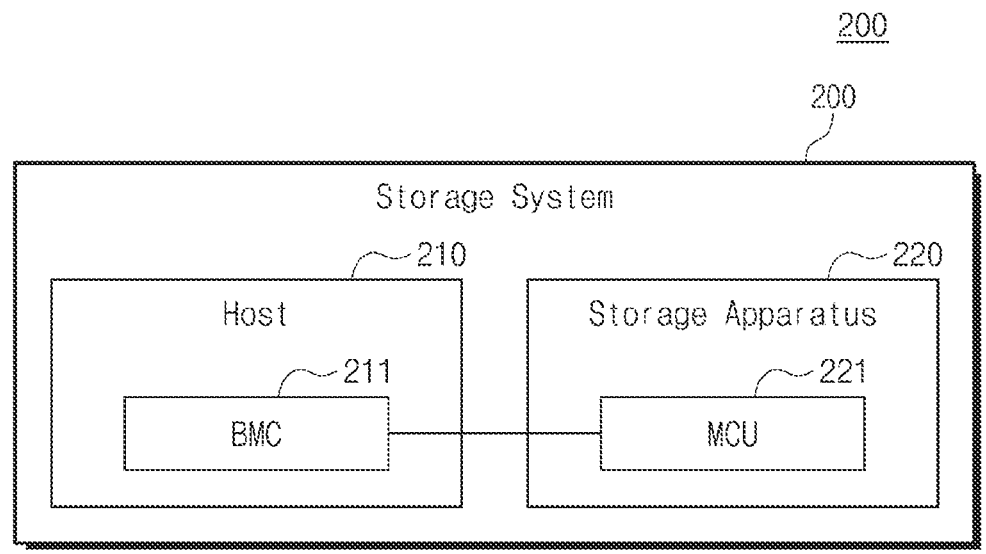
FIG. 2 is a block diagram illustrating a storage system according to an example embodiment of the present disclosure.

FIG. 2 is a block diagram illustrating a storage system according to an example embodiment of the present disclosure.

Referring to FIG. 2, a storage system 200 according to an example embodiment of the present disclosure may include a host 210 and a storage apparatus 220.

The host 210 may include a BMC 211. The storage apparatus 220 may include a MCU 221. The baseboard management controller 211 may communicate with the micro controller unit 221 of the storage apparatus 220 to obtain at least one of product information of the storage medium and state information of the storage medium in the storage apparatus 220. For example, the baseboard management controller 211 may include a communication unit (not shown). The communication unit may communicate with the micro controller unit 221 of the storage apparatus 220 to obtain at least one of product information of the storage medium and state information of the storage medium in the storage apparatus 220.

After that, based on information acquired from the micro controller unit 221, the baseboard management controller 211 may operate the storage apparatus 220. For example, the baseboard management controller 211 may include an operation unit (not shown). The operation unit may operate the storage apparatus 220 based on the information acquired from the communication unit. In an embodiment, the operation unit may send information for operating the storage apparatus 220 to the micro controller unit 221 through the communication unit, in response to the information indicating that the storage apparatus 220 is in an abnormal state. That is, the baseboard management controller 211 according to the example embodiment of the present disclosure may control the operation of the storage apparatus 220 based on the information received from the micro controller unit, thus enhancing the management function of the storage apparatus 220 by the baseboard management controller 211 (e.g., out-of-band management functions).

More specifically, referring back to FIG. 1, it may be seen that the out-of-band management of the related-art technology storage apparatus 120 has the following two disadvantages: 1) the out-of-band management function of the baseboard management controller 112 with respect to the storage apparatus 120 is limited and the baseboard management controller 112 may only obtain the VPD information of the storage apparatus 120 and the temperature information of the electrically erasable programmable read only memory EEPROM 124 from the electrically erasable programmable read only memory EEPROM 124 of the storage apparatus 120 by out-of-band management; 2) The host 110 processes the information collected by the micro controller unit 122 in the storage apparatus 120 in a completely in-band management manner. In this case, once the state of the host CPU or the master controller of the storage apparatus becomes abnormal, the host will not be able to obtain the status information of the storage apparatus 120 and cannot manage the CPU.

In contrast, the baseboard management controller 211 of the present application has the capability of acquiring the status information of the storage apparatus 220 from the micro controller unit, thus extending the capability of out-of-band management to collect information from the storage apparatus 220. In addition, the baseboard management controller 211 according to an example embodiment of the present disclosure may control the operation of the storage apparatus 220 based on information received from the micro controller unit 221 by communication, thus enhancing the control capability of the host by the storage apparatus 220.

The storage apparatus 220 may include various types of storage apparatuses (e.g., volatile storage apparatus, non-volatile storage apparatus) for storing data. The product information of the storage apparatus 220 may include VPD information. For example, the VPD information may include basic information such as the serial number and model of the storage apparatus 220. The status information of the storage apparatus may include, but is not limited to, at least one of voltage, humidity, temperature, current, fan status information, and power status information. In addition, the status information of the storage apparatus 220 may be obtained in various ways. For example, as an example only, the status information of the storage apparatus 220 may be obtained by a sensor.

In one example, the baseboard management controller 211 may send information obtained from the micro controller unit 221 to the processor (not shown) of the host 210 so that the processor of the host 210 may determine an operation instruction to communicate to the storage apparatus 220 based on the information. The baseboard management controller 211 may receive an operation instruction communicated from the processor of the host 210 to the storage apparatus 220. After that, the baseboard management controller 211 may send an operation instruction to the micro controller unit 221 by communicating with the micro controller unit 221. For example, the micro controller unit 222 may perform a corresponding operation based on the received operation instruction.

In another example, the baseboard management controller 211 may determine an operation instruction to communicate to the storage apparatus 220 based on information obtained from the micro controller unit 221. The baseboard management controller 211 may send an operation instruction to the micro controller unit 221 by communicating with the micro controller unit 221. For example, the micro controller unit 222 may perform corresponding operations based on the received operation instruction.

That is, the baseboard management controller may directly or indirectly control the operation of the storage apparatus 220 based on information obtained from the micro controller unit 221 and, therefore, the management function of the baseboard management controller 211 on the storage apparatus 220 (e.g., out-of-band management function) is enhanced.

In one embodiment, the baseboard management controller 211 may send information for operating the storage apparatus 220 to the micro controller unit 221, in response to the information indicating that the storage apparatus 220 is in an abnormal state. The storage apparatus 220 may perform corresponding operations based on the received information for operating the storage apparatus 220. For example, the information for operating the storage apparatus 220 may be at least one of messages and commands. That is, in this embodiment, the baseboard management controller 211 may communicate with the micro controller unit 221 under abnormal conditions of the storage apparatus 220. Therefore, the control ability of the baseboard management controller 211 with respect to the storage apparatus 220 may be improved when the state of the storage apparatus 220 is abnormal.

The communication may have various forms. In one example, the baseboard management controller 211 may continuously communicate with the micro controller unit 221. In another example, the baseboard management controller 211 may communicate indirectly (e.g., periodically or aperiodically) with the micro controller unit 221.

In addition, the baseboard management controller 211 may determine whether the state of the storage apparatus 220 is abnormal by various ways. For example, the baseboard management controller 211 may determine whether the state of the storage apparatus 220 is abnormal based on the signal of the processor of the host 210. However, the above examples are only exemplary, and the present disclosure is not limited thereto.

In one example, the baseboard management controller 211 may communicate with the micro controller unit 221 based on an internal integrated circuit bus or a system management bus. Therefore, the baseboard management controller 211 may efficiently communicate with the micro controller unit 221. However, the above example is only exemplary, and the present disclosure is not limited thereto. The bus or protocol on which the communication is based may be any other bus or protocol.

In the storage apparatus 220, the micro controller unit 221 may monitor the status information of the storage apparatus 220. As described above, the status information of the storage apparatus may include, but is not limited to, at least one of voltage, humidity, temperature, current, fan status information, and power status information. In addition, the micro controller unit 221 may store at least one of the status information of the storage apparatus 220 and the product information of the storage apparatus 220. As described above, the product information of the storage apparatus 220 may include VPD information. For example, the VPD information may include basic information such as the serial number and model of the storage apparatus 220. The micro controller unit 221 may send information to the baseboard management controller by communicating with the baseboard management controller 220.

Since the micro controller unit 221 may send at least one of the status information of the storage apparatus 220 and the product information of the storage apparatus 220 to the external baseboard management controller, the management function for the storage apparatus 220 (e.g., out-of-band management function) is enhanced.

In one embodiment, the micro controller unit may include a persistent memory (not shown). The persistent memory may be used to store at least one of the status information of the storage apparatus 220 and the product information of the storage apparatus 220. Therefore, at least one of the state information of the storage apparatus 220 and the product information of the storage apparatus 220 may be reliably stored in the micro controller unit.

The operation of each component of the present disclosure will be described in connection with FIGS. 3 to 6B. However, these descriptions are only exemplary. The disclosure is not limited to this.

Figure 3:
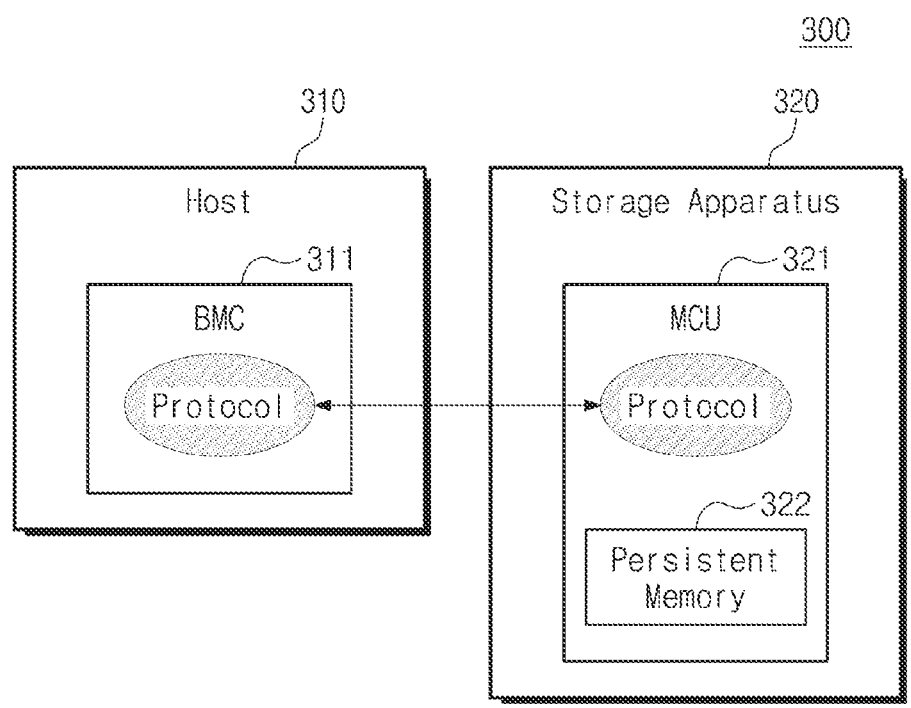
FIG. 3 is a block diagram illustrating a storage system according to an example embodiment of the present disclosure.

FIG. 3 is a block diagram illustrating a storage system according to an example embodiment of the present disclosure.

Referring to FIG. 3, a storage system 300 according to an example embodiment of the present disclosure may include a host 310 and a storage apparatus 320. The storage apparatus 320 may include an MCU 321. The micro controller unit 321 may acquire information of the storage apparatus 320. The host 310 may include a BMC 311. The baseboard management controller 311 may receive information from the micro controller unit 321 by out-of-band management and control the operation of the storage apparatus 320 based on the information. That is, the host 310, the storage apparatus 320, the micro controller unit 321, and the baseboard management controller 311 may be similar to the host 210, the storage apparatus 220, the micro controller unit 221, and the baseboard management controller 211 of FIG. 2, respectively. Therefore, the repeated description will be omitted and the differences between FIG. 3 and FIG. 2 will be mainly described below with reference to FIG. 3.

In one embodiment, the micro controller unit 311 may include a persistent memory 322. The persistent memory 322 may store information of the storage apparatus 320 acquired by the micro controller unit 321. The information of the storage apparatus 320 may include at least one of vital product data, software information, and hardware information of the storage apparatus 320. For example, the hardware information may be information about hardware inside the storage apparatus 320 (e.g., voltage, capacitance status, temperature, humidity, power supply, and fan, etc., for example, only as an example) and may be obtained by sensors inside the storage apparatus 320, for example. The software information may be information about software and/or programs inside the storage apparatus 320 (e.g., only as an example, operation status information, etc.).

Referring back to FIG. 1, in the storage system 100 of the related art of FIG. 1, limited specific information (i.e., vital product data information of the storage apparatus 120 and temperature information of the electrically erasable programmable read only memory 124) is stored by setting the electrically erasable programmable read only memory 124 in the storage apparatus 120, which makes the out-of-band management capability of the storage apparatus 120 insufficient.

In contrast, in this embodiment, since a persistent memory 322 for storing various information of the storage apparatus 320 (e.g., at least one of vital product data, software information, and hardware information of the storage apparatus 320) is set in the micro controller unit 311, various information may be transmitted by the micro controller unit 311 to the baseboard management controller 311 by out-of-band management, Thus, the out-of-band management capability of the storage apparatus 320 is enhanced and expanded.

In one embodiment, out-of-band management between the baseboard management controller 311 and the micro controller unit 321 may be implemented by a software communication protocol stack between the baseboard management controller 311 and the micro controller unit 321, wherein the software communication protocol stack may include at least one of an internal integrated circuit bus and a system management bus.

The software communication protocol stack between the baseboard management controller 311 and the micro controller unit 321 may enable the baseboard management controller 311 and the micro controller unit 321 to have one or more of the functions of assembling messages, transmitting messages, receiving messages, parsing messages, processing messages, etc. The baseboard management controller 311 may send messages to MCU 321 by its own software communication protocol stack, and the micro controller unit 321 may receive messages by its own software communication protocol stack with complete relevant operations and reply messages to BMC 311 so as to achieve the function of out-of-band communication. In one example, the software communication protocol stack between the baseboard management controller 311 and the micro controller unit 321 may be an inter integrated circuit (I2C) bus. In another example, the software communication protocol stack between the baseboard management controller 311 and the micro controller unit 321 may be a system management bus (SMBus). However, the above example is only exemplary and the software communication protocol stack between the baseboard management controller 311 and the micro controller unit 321 of the present disclosure is not limited to this and may be any other bus or a combination of multiple buses.

In this embodiment, by implementing the software communication protocol stack between the baseboard management controller 311 and the micro controller unit 321, the communication ability between the baseboard management controller 311 and the micro controller unit 321 may be enhanced, so that more messages and commands may be sent between them and the out-of-band management ability of the baseboard management controller 311 to the storage apparatus may be enhanced and expanded. The baseboard management controller 311 may better monitor and manage the storage apparatus. For example, when the baseboard management controller 311 detects an abnormal power failure of the host, the baseboard management controller 311 may send a message to the storage apparatus 320 by out-of-band management to make the storage apparatus 320 take countermeasures, which may ensure data integrity and prevent data loss.

In one embodiment, the storage apparatus 320 may not include an electrically erasable programmable read only memory. For example, the electrically erasable programmable read only memory may be the electrically erasable programmable read only memory 124 described with reference to FIG. 1. In other words, the storage apparatus 320 may not include an electrically erasable programmable read only memory for storing vital product data and may not include a temperature sensor (e.g., the electrically erasable programmable read only memory 124 of FIG. 1).

In this embodiment, since the electrically erasable programmable read only memory is removed from the storage apparatus 320, the space on the main board of the storage apparatus 320 is saved and the cost of the storage apparatus 320 is reduced.

In addition, alternatively, the host 310 may also include a central processing unit (not shown) and the storage apparatus 320 may also include a main controller (not shown) that communicates with the micro controller unit 321. The central processing unit may communicate with the main controller by in-band management.

In addition, alternatively, the storage apparatus 320 also includes a power supply unit (not shown) and a standby power supply (not shown) configured to supply power to the micro controller unit 321. When the power supply unit cannot supply power, the standby power supply supplies power to the micro controller unit 321. Since one of the power supply unit and the standby power supply may be used to supply power to the micro controller unit 321, stable out-of-band management may be realized.

In one embodiment, when the main controller of the storage apparatus 320 cannot communicate with the micro controller unit 321 due to a fault, the baseboard management controller 311 may receive fault related information from the micro controller unit by out-of-band management and determine the cause of the fault and/or repair the fault based on the fault related information.

That is, when the main controller of the storage apparatus 320 is in an abnormal state and cannot carry out in-band communication, the baseboard management controller 311 may communicate with the storage apparatus 320 by the out-of-band management mode according to the example embodiment of the present disclosure, obtain the information before and after the error of the main controller of the storage apparatus 320 (for example, only as an example, hardware monitoring information, log information, etc.), and use the information for fault analysis so as to conveniently and quickly locate the cause of the fault and repair the fault. Effectively reducing the failure time may greatly reduce the production loss and cost caused by the failure of storage apparatus 320 in industrial production.

In addition, the storage system 300 according to the example embodiment of the present disclosure may collect the internal hardware information of the storage apparatus 320 by the baseboard management controller 311 and store it in the persistent memory 322 of the micro controller unit 321, and then the baseboard management controller 311 communicates with the micro controller unit 321 by out-of-band management, which solves the problem that when the main controller of the storage apparatus in FIG. 1 is abnormal, the host cannot monitor the internal hardware of the storage apparatus.

Figure 4:
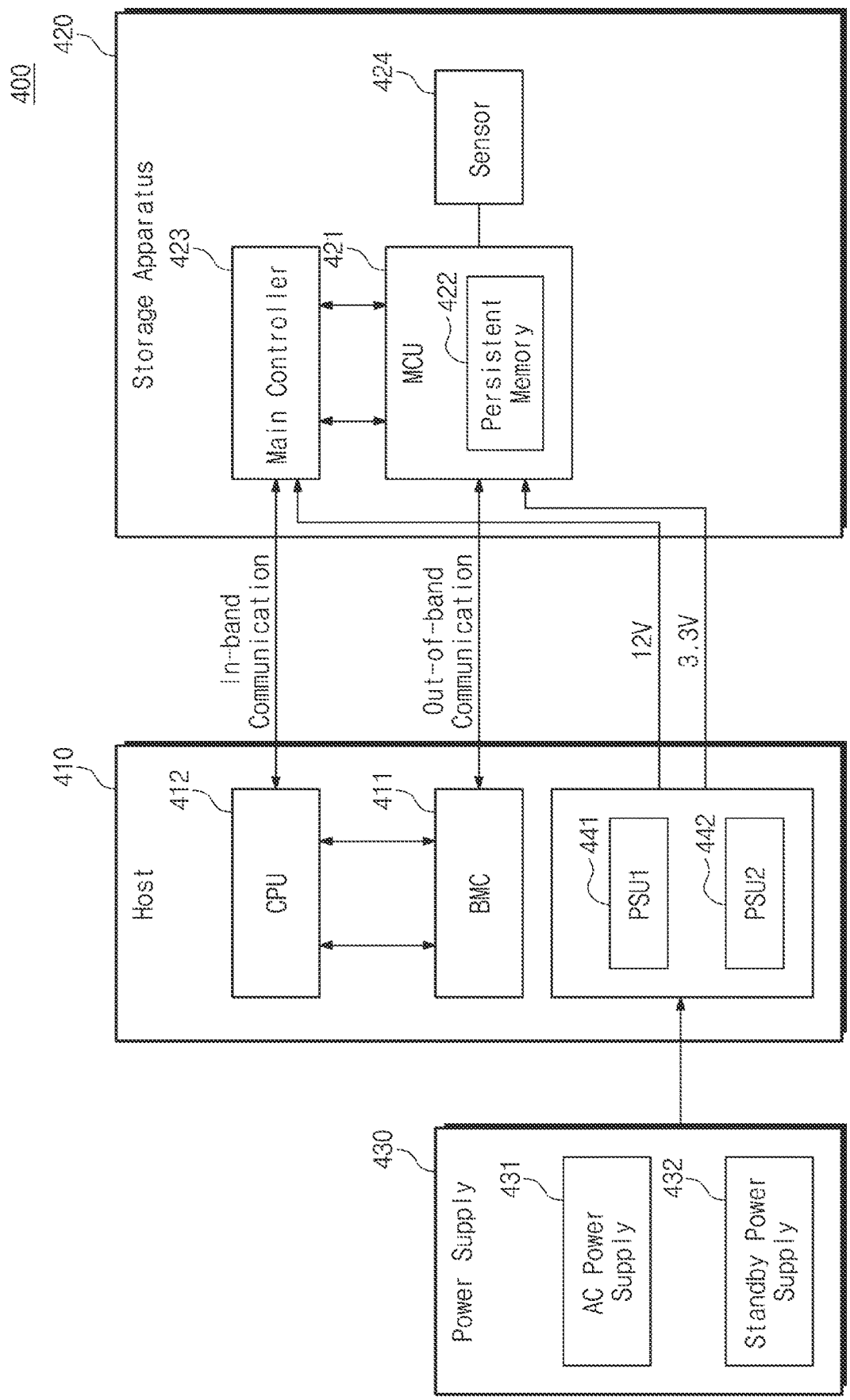
FIG. 4 is a block diagram illustrating a storage system according to an example embodiment of the present disclosure.

FIG. 4 is a block diagram illustrating a storage system according to an example embodiment of the present disclosure.

Referring to FIG. 4, a storage system 400 according to an example embodiment of the present disclosure may include a host 410 and a storage apparatus 420. The storage apparatus 420 may include an MCU 421. The micro controller unit 421 may acquire information of the storage apparatus 420. The host 410 may include a BMC 411. The baseboard management controller 411 may receive information from the micro controller unit 421 by out-of-band management and control the operation of the storage apparatus 420 based on the information. The micro controller unit 421 may include a persistent memory 422. The persistent memory 422 may store information of the storage apparatus 420 acquired by the micro controller unit 421. That is, the host 410, the storage apparatus 420, the micro controller unit 421, the baseboard management controller 411, and the persistent memory 422 may be similar to the host 310, the storage apparatus 320, the micro controller unit 321, the baseboard management controller 311, and the persistent memory 322 of FIG. 3, respectively. Therefore, the repeated description will be omitted and the differences between FIG. 4 and FIG. 3 will be mainly described below with reference to FIG. 4.

The micro controller unit 421 may be a control device. The micro controller unit 421 may be connected to a sensor 424 inside the storage apparatus 420 and obtain hardware information (for example, only as an example, information such as voltage, electric quantity, current, etc.). The micro controller unit 421 includes a persistent memory 422. The persistent memory 422 may be used to store one or more of the collected hardware information, vital product data information, and other required information.

A first power supply unit (PSU1) 441 and a second power supply unit (PSU2) 442 may supply power to the main controller 423 and the micro controller unit 421, respectively. In one example, the main controller 423 may operate with a voltage of 12V and the micro controller unit 421 may operate with a voltage of 3.3V. However, the above example is only exemplary, and the operating voltage of the main controller 423 and the micro controller unit 421 of the present disclosure is not limited to this and may be the value of any other voltage.

When the first power supply unit 441 cannot supply power, the standby power supply 432 may continue to supply power to the micro controller unit 421 to continue the out-of-band management, so as to ensure stable out-of-band management. When the second power supply unit 442 cannot supply power, the standby power supply 432 may continue to supply power to the main controller 423.

Although FIG. 4 shows that the first power supply unit 441 and the second power supply unit 442 are located in the host 410, the arrangement positions of the first power supply unit 441 and the second power supply unit 442 of the present disclosure are not limited to thereto and may be any other position (e.g., a position in the storage apparatus 420 or a position other than the host 410 and the storage apparatus 420).

In addition, the first power supply unit 441 and the second power supply unit 442 may receive power from the external power supply 430. For example, the power supply 430 may include an alternating current (AC) power supply 431 and a standby power supply 432.

Compared with the storage apparatus 100 of the related art of FIG. 1, according to the example embodiment of the present disclosure, the hardware architecture of the storage apparatus is improved and the electrically erasable programmable read-only memory is removed from the storage apparatus 400, which saves space on the main board of the storage apparatus 400 and reduces the cost of the storage apparatus.

Referring back to FIG. 1, the information stored in the electrically erasable programmable read only memory 124 in the related art storage apparatus 120 of FIG. 1 is limited and the electrically erasable programmable read only memory 124 only stores the vital product data information of the storage apparatus and the temperature information of the electrically erasable programmable read only memory. In contrast, the storage system 400 according to the example embodiment of the present disclosure uses the micro controller unit 421 in the storage apparatus 420 as the core component of out-of-band management of the storage apparatus 420. The micro controller unit 421 is connected with the sensor inside the storage apparatus 420 and is responsible for collecting information of hardware inside the storage apparatus 420 (e.g., voltage, capacitance state, temperature, etc.) and/or other information. This information will be stored in the persistent memory 422 of the micro controller unit 421. The persistent memory 422 of the micro controller unit 421 may store not only the vital product data information of the original storage apparatus but also the hardware information and/or other information inside the storage apparatus, which enhances and expands the out-of-band management ability of the storage apparatus.

In addition, the storage system 400 according to the example embodiment of the present disclosure may collect the hardware information and/or other information inside the storage apparatus 420 by the micro controller unit 421, store this information in the persistent memory 422 of the micro controller unit 421, and then the baseboard management controller 411 communicates with the micro controller unit 421 by out-of-band management, which solves the problem that when the state of the main controller of the storage apparatus 420 is abnormal, the host 410 (for example, CPU 412) cannot monitor the hardware inside the storage apparatus 420.

Generally, the average time between failures of the main controller of the storage apparatus is 1.5 million hours, while the baseboard management controller on the host and the micro controller unit in the storage apparatus are the source elements with the highest time between failures and the average time between failures of the baseboard management controller is 7.35 billion hours. The mean time between failures of micro controller units is 100 million hours. Therefore, the storage system 400 according to the example embodiment of the present disclosure may use the micro controller unit 421 as the main component of the out-of-band management of the storage apparatus 420, carry out out-of-band management by the baseboard management controller 411 and the micro controller unit 421, and expand and enhance the function of out-of-band management of the storage apparatus 420, so that the high availability of the micro controller unit 421 may greatly improve the stability of out-of-band management of the storage apparatus 420. Moreover, when the power supply unit cannot supply power, the standby battery may provide voltage (for example, only as an example, 3.3V) to continue to supply power to the micro controller unit 421, so that the out-of-band management continues to work, ensuring the stability and reliability of out-of-band management.

In addition, according to the storage system 400 of the example embodiment of the present disclosure, when the main controller 423 of the storage apparatus 420 is in an abnormal state and cannot carry out in-band communication, the baseboard management controller 411 may communicate with the storage apparatus 420 by out-of-band management mode to obtain the information before and after the error of the main controller 423 of the storage apparatus 420 (for example, only as an example, hardware monitoring information, log information, etc.). This information may be used for fault analysis, so as to be conveniently and quickly locate the cause of the fault and repair the fault. That is, the storage system 400 according to the example embodiment of the present disclosure may effectively reduce the failure time and greatly reduce the production loss and cost caused by the failure of the storage apparatus 420 in industrial production.

Referring back to FIG. 1, the extent of the out-of-band management of the storage apparatus 120 by the baseboard management controller 112 in the related art storage system 100 of FIG. 1 is that the baseboard management controller 112 obtains the vital product data information of the storage apparatus 120 and the sensor information of the electrically erasable programmable read only memory from the electrically erasable programmable read only memory 124, while the baseboard management controller 112 cannot operate or control the storage apparatus 120 by out-of-band management. In contrast, the storage system 400 according to the example embodiment of the present disclosure enhances the communication capability between the baseboard management controller 411 and the micro controller unit 421 of the storage apparatus 420 by implementing the software communication protocol stack between the baseboard management controller 411 and the micro controller unit 421 of the storage apparatus 420, so that more messages, commands, etc. may be sent between the baseboard management controller 411 and the micro controller unit 421 of the storage apparatus 420. The out-of-band management ability of the baseboard management controller 411 to the storage apparatus 420 is enhanced and expanded, so that the baseboard management controller 411 may better monitor and manage the storage apparatus 420. For example, the baseboard management controller 411 detects that the host 410 is abnormally powered down and the baseboard management controller 411 may send a message to the storage apparatus 420 by out-of-band management to make the storage apparatus 420 take countermeasures, which may ensure data integrity and prevent data loss.

Figure 5A:
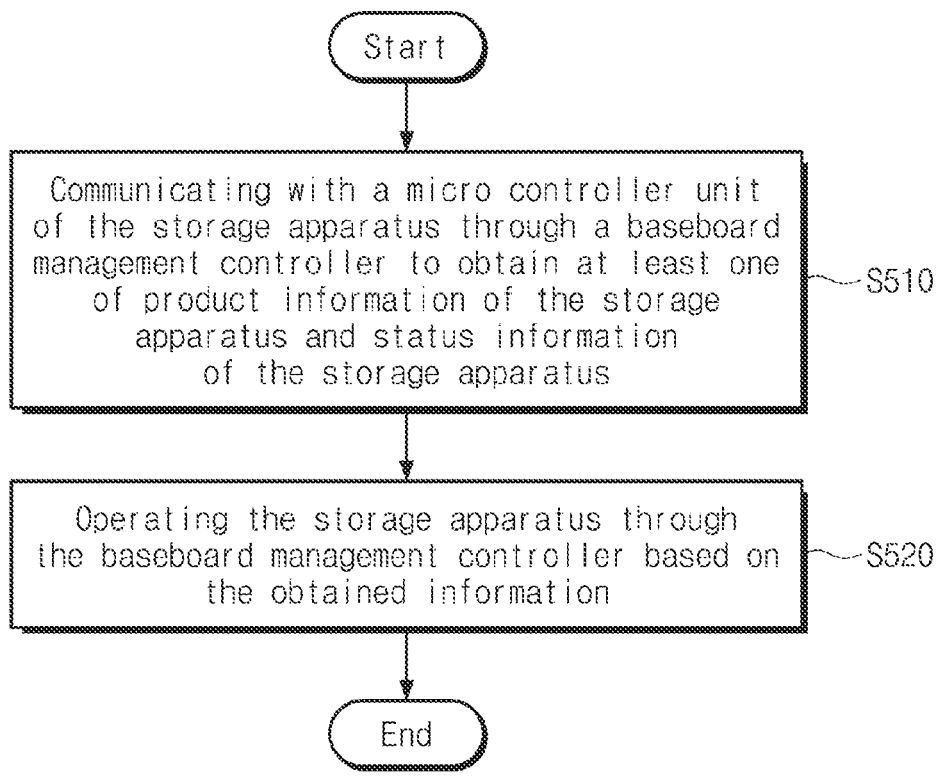
FIG. 5A is a flowchart illustrating an out-of-band management method according to an example embodiment of the present disclosure.

FIG. 5A is a flowchart illustrating an out-of-band management method according to an example embodiment of the present disclosure.

Referring to FIG. 5A, in operation S510, the baseboard management controller may communicate with the micro controller unit of the storage apparatus to obtain at least one of the product information of the storage apparatus and the status information of the storage apparatus. Operation S510 may be an operation performed by the baseboard management controller described with reference to any one of FIGS. 2 to 4. Therefore, for simplicity, operation S510 will not be described in detail here.

In operation S520, the storage apparatus may be operated by the baseboard management controller based on the acquired information. Operation S520 may be an operation performed by the baseboard management controller described with reference to any one of FIGS. 2 to 4. Therefore, for simplicity, operation S520 will not be described in detail here.

Figure 5B:
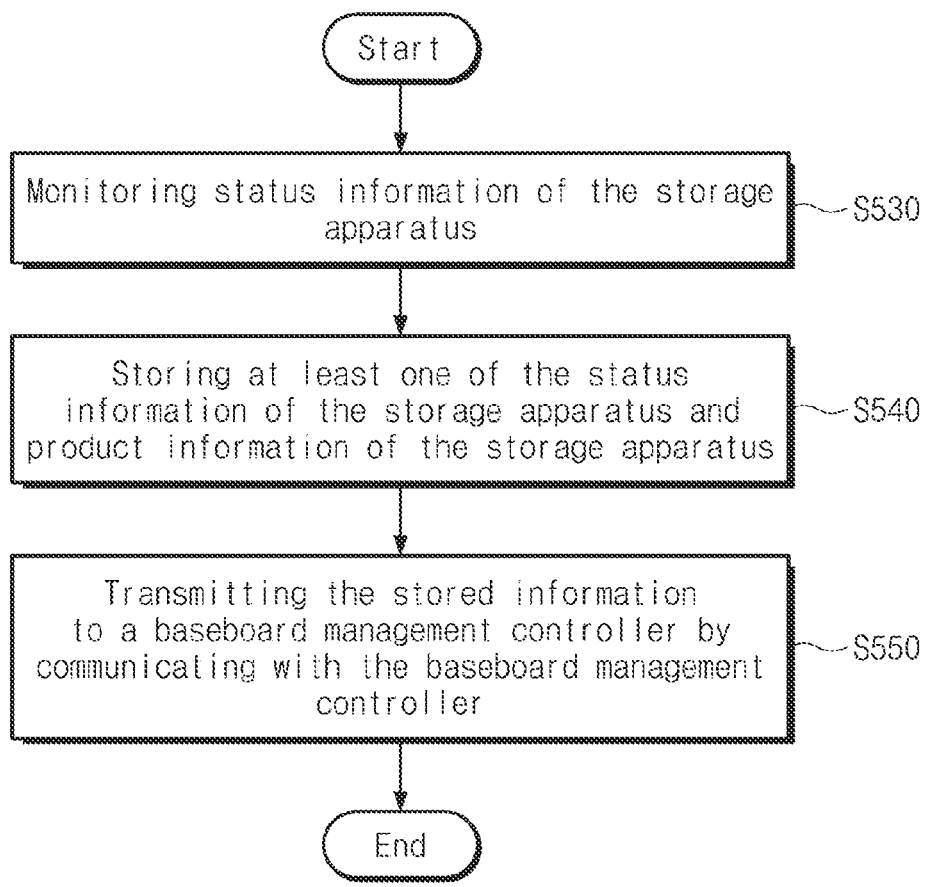
FIG. 5B is a flowchart illustrating an out-of-band management method according to an example embodiment of the present disclosure.

FIG. 5B is a flowchart illustrating an out-of-band management method according to an example embodiment of the present disclosure.

Referring to FIG. 5B, in operation S530, the micro controller unit may monitor the status information of the storage apparatus. Operation S530 may be an operation performed by the micro controller unit described with reference to any one of FIGS. 2 to 4. Therefore, for simplicity, operation S530 will not be described in detail here.

In operation S540, the micro controller unit may store at least one of the status information of the storage apparatus and the product information of the storage apparatus. Operation S540 may be an operation executable by the micro controller unit described with reference to any one of FIGS. 2 to 4. Therefore, for simplicity, operation S540 will not be described in detail here.

In operation S550, the micro controller unit may send information to the baseboard management controller by communicating with the baseboard management controller. Operation S550 may be an operation executable by the micro controller unit described with reference to any one of FIGS. 2 to 4. Therefore, for simplicity, operation S550 will not be described in detail here.

Figure 6A:
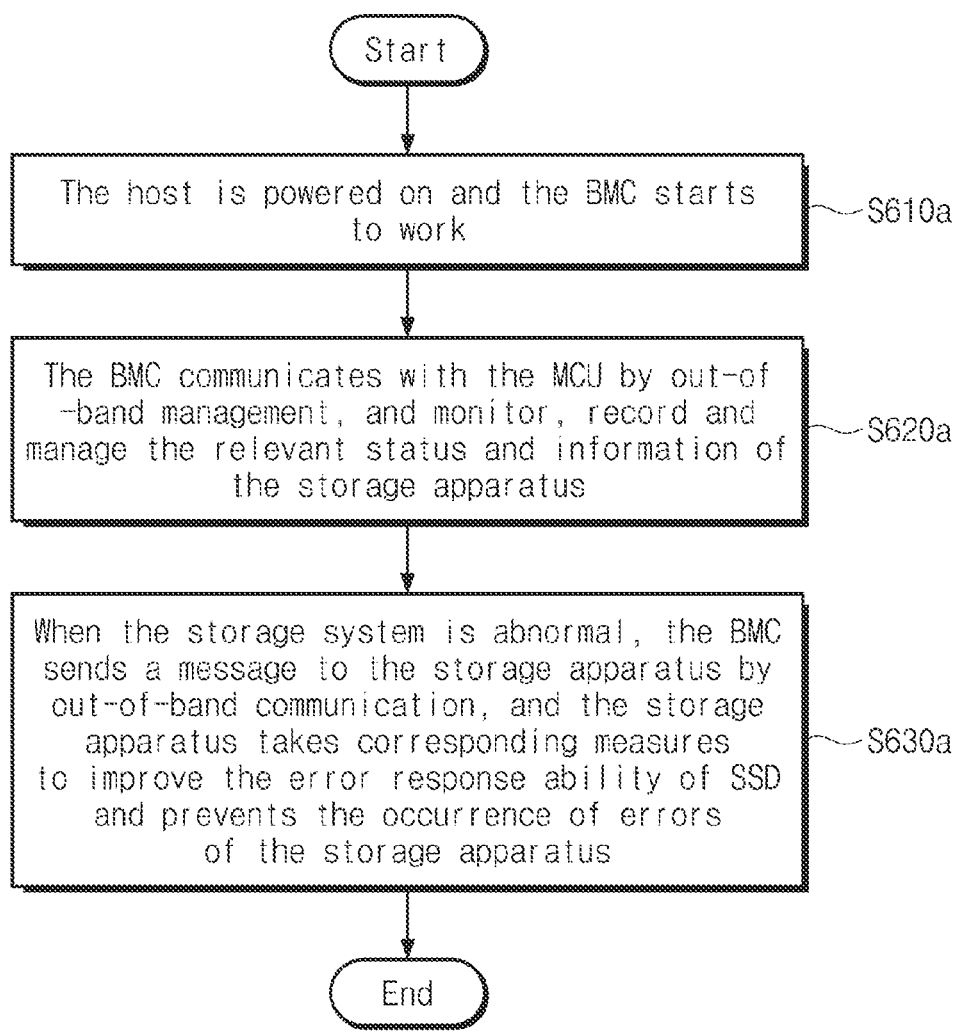
FIG. 6A illustrates a flowchart of an out-of-band management method according to an example embodiment of the present disclosure.

FIG. 6A illustrates a flowchart of an out-of-band management method according to an example embodiment of the present disclosure.

Referring to FIG. 6A, in operation S610*a*, the host is powered on and the BMC starts to work. In one example, the BMC works no matter whether there is an operating system or not and whether the state of the operating system is normal.

In operation S620*a*, the BMC may communicate with the MCU by out-of-band management and monitor, record, and manage the relevant status and information of the storage apparatus. In one example, the BMC continuously communicates with the MCU by out-of-band management and monitors, records, and manages the relevant status and information of the storage apparatus.

In operation S630*a*, when the state of the storage system is abnormal, the BMC may send a message to the storage apparatus by out-of-band communication and the storage apparatus may take corresponding measures to improve the error response ability of the SSD and prevent the occurrence of errors of the storage apparatus. That is, according to the method of the example embodiment of the present disclosure, when the state of the storage system (e.g., storage apparatus) is abnormal, the in-band communication has been unable to work, the out-of-band communication of the storage apparatus is not affected, and the BMC may still communicate with the SSD by out-of-band management to obtain the relevant information of the SSD.

Figure 6B:
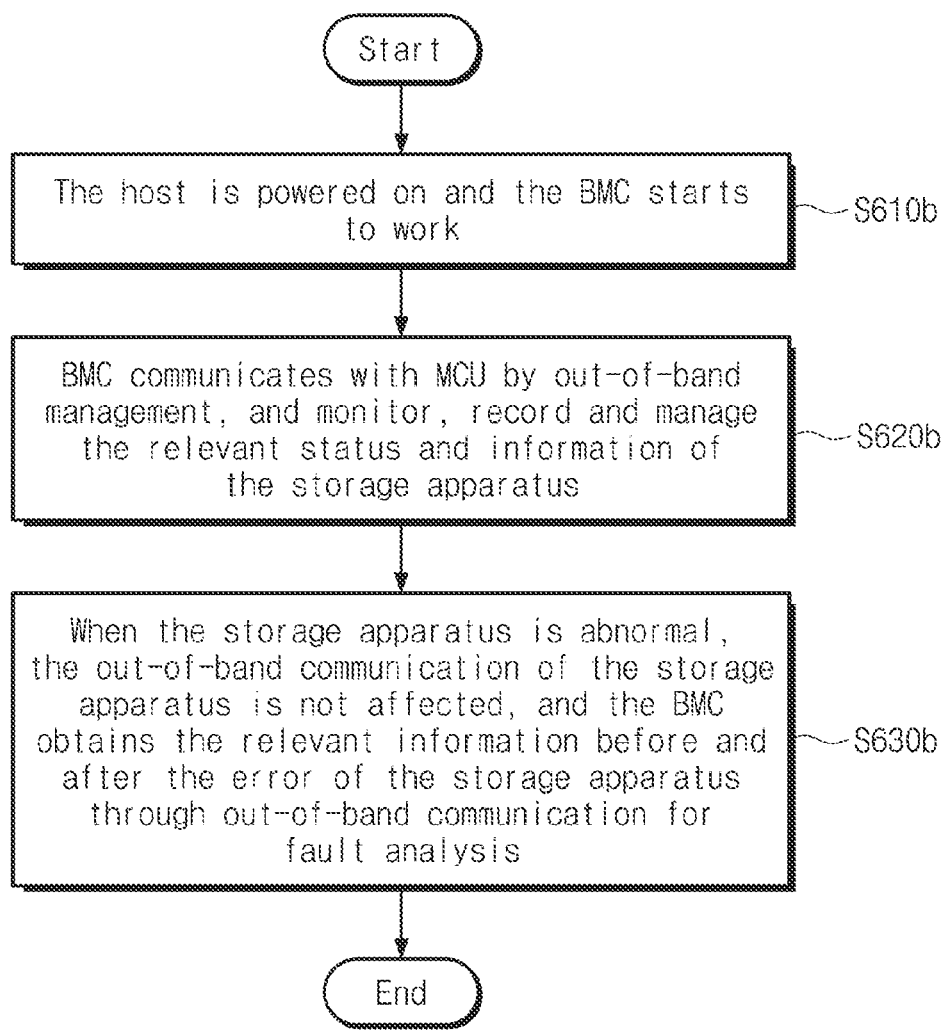
FIG. 6B illustrates a flowchart of an out-of-band management method according to an example embodiment of the present disclosure.

FIG. 6B illustrates a flowchart of an out-of-band management method according to an example embodiment of the present disclosure.

Referring to FIG. 6B, in operation S610*b*, the host is powered on and the BMC starts working. In one example, the BMC works no matter whether there is an operating system or not and whether the state of the operating system is normal.

In operation S620*b*, the BMC may communicate with the MCU by out-of-band management and monitor, record, and manage the relevant status and information of the storage apparatus. In one example, the BMC continuously communicates with the MCU by out-of-band management and monitors, records, and manages the relevant status and information of the storage apparatus.

In operation S630b, when the storage apparatus is abnormal, the out-of-band communication of the storage apparatus is not affected and the BMC obtains the relevant information before and after the error of the storage apparatus by out-of-band communication for fault analysis. In other words, when the storage apparatus is abnormal, the in-band communication cannot work and the out-of-band communication of the storage apparatus is not affected. The BMC may still communicate with the storage apparatus by out-of-band management, obtain the relevant information before and after the error of the storage apparatus, and conduct fault analysis so as to quickly locate the problem and repair the fault.

Figure 6C:
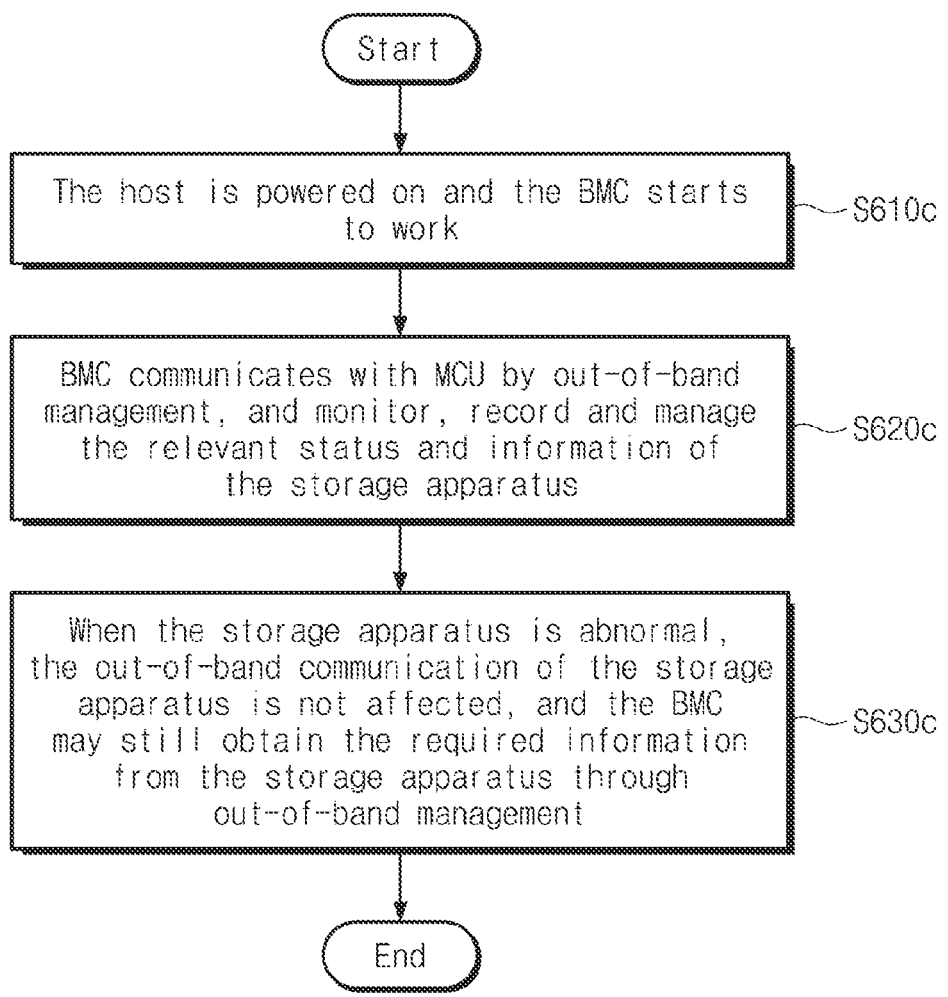
FIG. 6C illustrates a flowchart of an out-of-band management method according to an example embodiment of the present disclosure.

FIG. 6C illustrates a flowchart of an out-of-band management method according to an example embodiment of the present disclosure;

Referring to FIG. 6C, in operation S610c, the host is powered on and the BMC starts working. In one example, the BMC works no matter whether there is an operating system or not and whether the operating system is normal.

In operation S620c, the BMC may communicate with the MCU by out-of-band management and monitor, record, and manage the relevant status and information of the storage apparatus. In one example, the BMC continuously communicates with the MCU by out-of-band management and monitors, records, and manages the relevant status and information of the storage apparatus.

In operation S630c, when the state of the storage apparatus is abnormal, the out-of-band communication of the storage apparatus is not affected and the BMC may still obtain the required information from the storage apparatus by out-of-band management. In other words, if an abnormal condition occurs in the storage system, BMC may send a message to the storage apparatus by out-of-band management so that the storage apparatus may take corresponding measures in advance for the abnormal condition, take corresponding action against the system error, improve the error response ability of the storage apparatus, and prevent the occurrence of storage apparatus errors.

Figure 7:
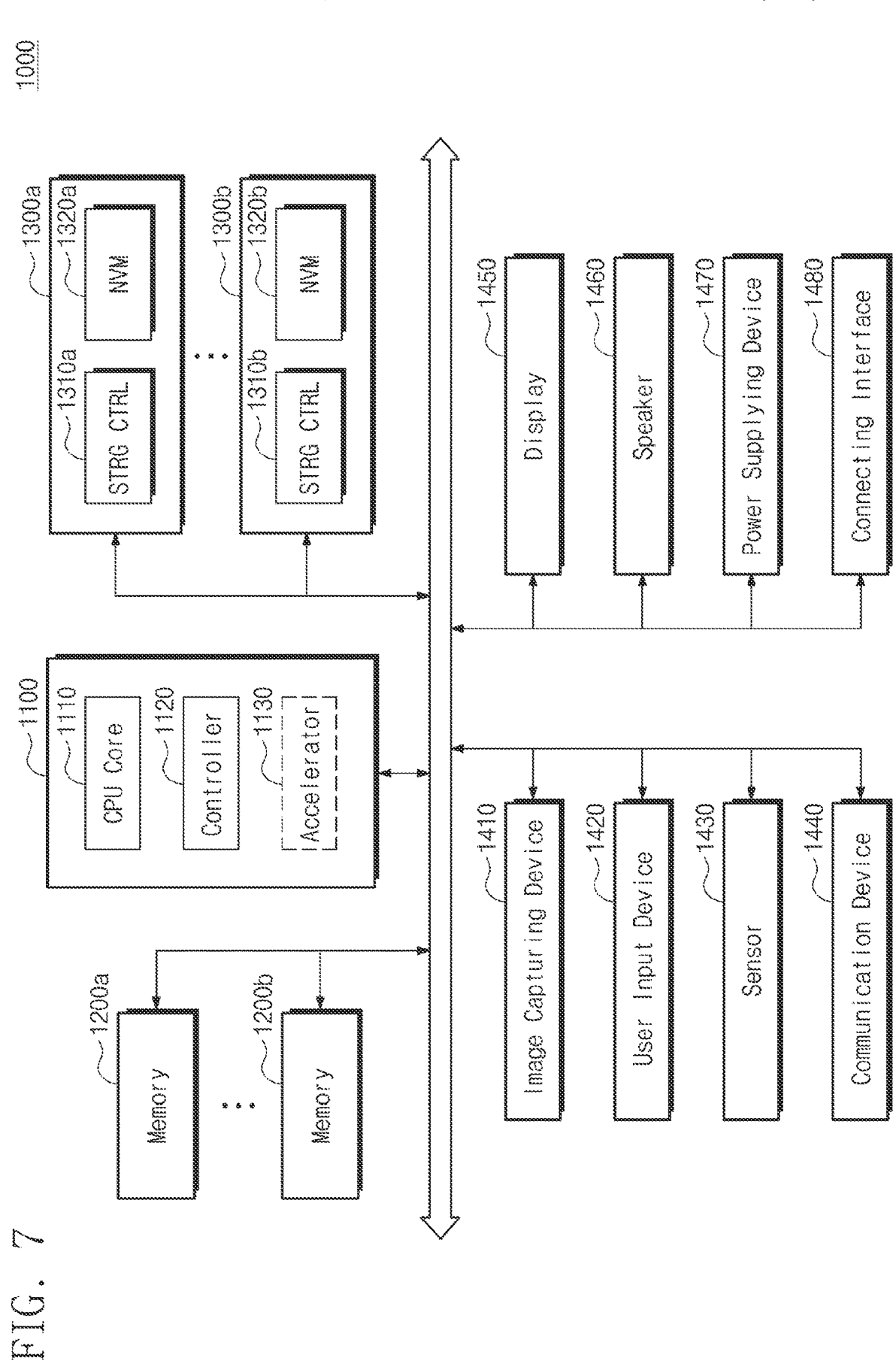
FIG. 7 is a diagram of a system to which a storage device is applied, according to an embodiment.

FIG. 7 is a diagram of a system 1000 to which a storage device is applied, according to an embodiment. The system 1000 of FIG. 7 may basically be a mobile system, such as a portable communication terminal (e.g., a mobile phone), a smartphone, a tablet personal computer (PC), a wearable device, a healthcare device, or an Internet of things (IOT) device. However, the system 1000 of FIG. 7 is not necessarily limited to the mobile system and may be a PC, a laptop computer, a server, a media player, or an automotive device (e.g., a navigation device).

Referring to FIG. 7, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

In some embodiments, the system 1000 also includes a baseboard management controller (not shown). For example, memories (e.g., 1200A and 1200b) and storage devices (e.g., 1300A and 1300B) include micro controller units (not shown). The baseboard management controller may be a baseboard management controller described with reference to at least one of FIGS. 2 to 6, and the micro controller unit may be a micro controller unit described with reference to at least one of FIGS. 2 to 6.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. An accelerator 1130 may include a graphics processing unit (GPU), a neural processing unit (NPU), and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, phase-change RAM (PRAM), and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto and have larger storage capacity than the memories 1200a and 1200b. The storage devices 1300a and 1300b may respectively include storage controllers (STRG CTRL) 1310a and 1310b and NVMs (Non-Volatile Memory) 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300b may have types of solid-state devices (SSDs) or memory cards and be removably combined with other components of the system 1000 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a vitalpad, a vitalboard, a mouse, and/or a microphone.

The sensor 1430 may detect various types of physical quantities, which may be obtained from outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals with other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, universal serial bus (USB) interface, secure digital (SD) card interface, multi-media card (MMC) interface, eMMC interface, UFS interface, embedded UFS (eUFS) interface, and compact flash (CF) card interface.

Figure 8:
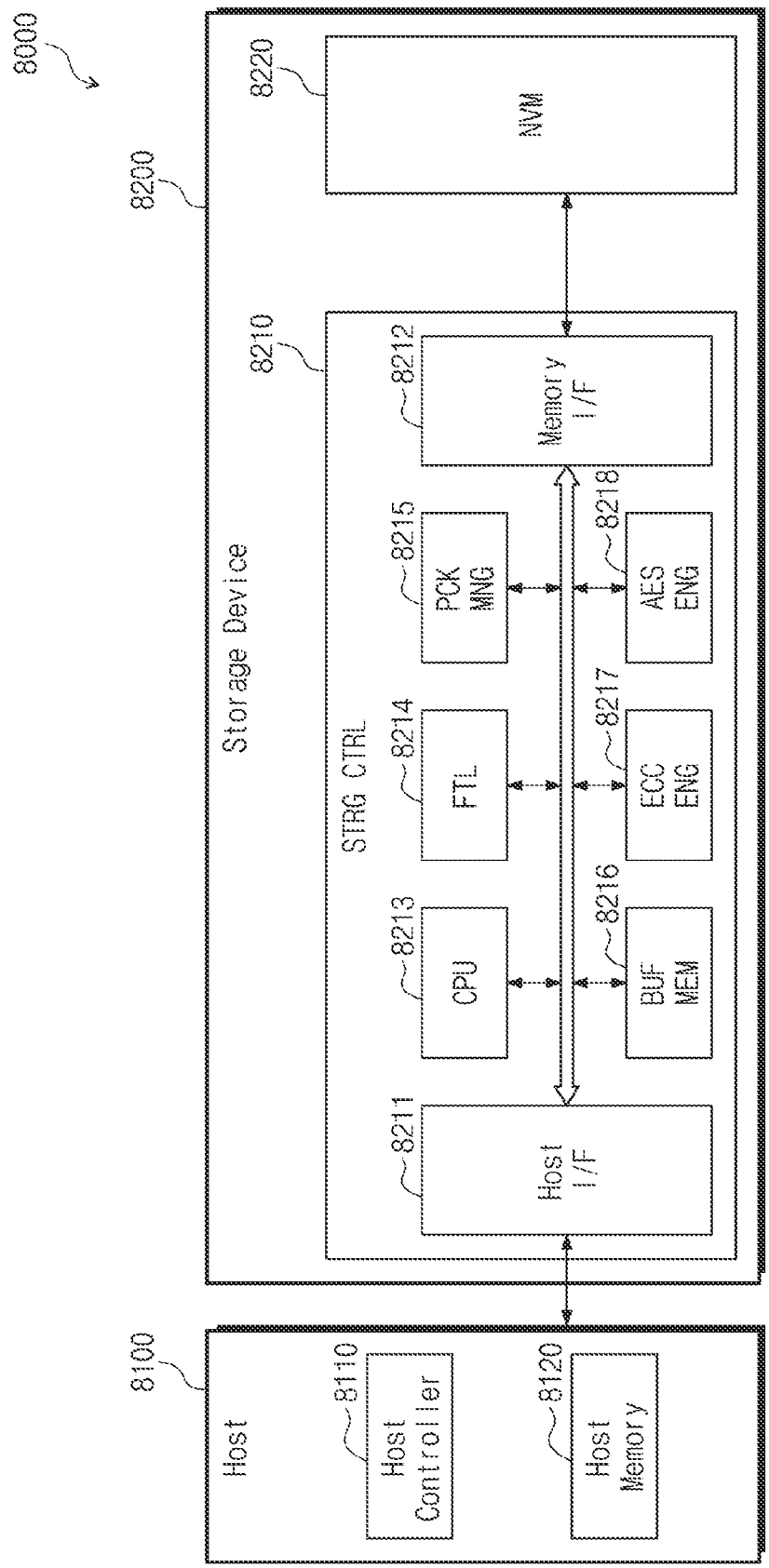
FIG. 8 is a block diagram of a host storage system according to an example embodiment.

FIG. 8 is a block diagram of a host storage system 8000 according to an example embodiment.

The host storage system 8000 may include a host 8100 and a storage device 8200. In addition, the storage device 8200 may include a memory controller 8210 and an NVM 8220. According to an example embodiment of the present disclosure, the host 8100 may include a host controller 8110 and a host memory 8120. The host memory 8120 may be used as a buffer memory configured to temporarily store data to be transmitted to or received from the storage device 8200.

In some embodiments, the host 8100 also includes a baseboard management controller (not shown). For example, the storage device 8200 also includes a micro controller unit (not shown). The baseboard management controller may be a baseboard management controller described with reference to at least one of FIGS. 2 to 6C, and the micro controller unit may be a micro controller unit described with reference to at least one of FIGS. 2 to 6C.

The storage device 8200 may include a storage medium configured to store data in response to a request from the host 8100. As an example, the storage device 8200 may include at least one of an SSD, an embedded memory, and a removable external memory. When the storage device 8200 is an SSD, the storage device 8200 may be an NVMe compliant device. When the storage device 8200 is an embedded memory or an external memory, the storage device 8200 may be a device conforming to the UFS standard or eMMC standard. Both the host 8100 and the storage device 8200 can generate a packet and send the packet according to the adopted standard protocol.

When the NVM 8220 of the storage device 8200 includes a flash memory, the flash memory may include a 2D NAND storage array or a 3D (or vertical) NAND (VNAND) storage array. As another example, the storage device 8200 may include various other kinds of NVMs. For example, the storage device 8200 may include magnetic random access memory (MRAM), spin transfer torque MRAM, conductive bridge RAM (CBRAM), ferroelectric RAM (FRAM), PRAM, RRAM, and various other types of memory.

According to an embodiment, the host controller 8110 and the host memory 8120 may be implemented as separate semiconductor chips. Alternatively, in some embodiments, the host controller 8110 and the host memory 8120 may be integrated in the same semiconductor chip. As an example, the host controller 8110 may be any one of a plurality of modules included in an application processor (AP). The AP can be implemented as a system on chip (SOC). In addition, the host memory 8120 may be an embedded memory included in the AP or a memory module external to the AP.

The host controller 8110 may manage an operation of storing data (e.g., write data) of the buffer area of the host memory 8120 in the NVM 8220 or an operation of storing data (e.g., read data) of the NVM 8220 in the buffer area.

The memory controller 8210 may include a host interface 8211, a memory interface 8212, and a CPU 8213. In addition, the memory controller 8210 may also include a flash conversion layer (FTL) 8124, a packet manager 8215, a buffer memory 8216, an error correction code (ECC) engine 8217, and an advanced encryption standard (AES) engine 8218. The memory controller 8210 may further include a working memory (not shown) in which the FTL 8214 is loaded. The CPU 8213 may execute FTL 8214 to control data write and read operations on the NVM 8220.

The host interface 8211 may send and receive packets to and from the host 8100. The packet sent from the host 8100 to the host interface 8211 may include commands or data to be written to the NVM 8220. The packet sent from the host interface 8211 to the host 8100 may include a response to a command or data read from the NVM 8220. The memory interface 8212 may send data to be written to the NVM 8220 or receive data read from the NVM 8220. The memory interface 8212 may be configured to comply with standard protocols such as toggle or open NAND flash interface (ONFI).

FTL 8214 can perform various functions, such as an address mapping operation, a wear balancing operation, and a garbage collection operation. The address mapping operation can be the operation of converting the logical address received from host 8100 into the physical address used to store data in NVM 8220. The wear balancing operation can prevent excessive degradation of specific blocks by allowing uniform use of NVM 8220 blocks. As an example, the wear equalization operation can be realized by using firmware technology to balance the erase count of physical blocks. The garbage collection operation can be a technology to ensure the available capacity in NVM 8220 by erasing the existing blocks after copying the valid data of the existing blocks to the new blocks.

The packet manager 8215 may generate packets according to a protocol that comports with the interface of the host 8100 or parse various types of information from packets received from the host 8100. In addition, the buffer memory 8216 may temporarily store data to be written to or read from the NVM 8220. Although the buffer memory 8216 may be a component included in the memory controller 8210, the memory controller 8216 alternatively may be external to the memory controller 8210.

ECC engine 8217 can perform error detection and correction operations on the read data read from NVM 8220. More specifically, ECC engine 8217 can generate parity bits for the write data to be written to NVM 8220 and the generated parity bits can be stored in NVM 8220 together with the write data. During an operation of reading data from NVM 8220, ECC engine 8217 can use the parity bit read from NVM 8220 to correct the error in the read data and output the read data after error correction.

The AES engine 8218 may perform at least one of an encryption operation and a decryption operation on the data input to the memory controller 8210 by using a symmetric vital algorithm.

Figure 9:
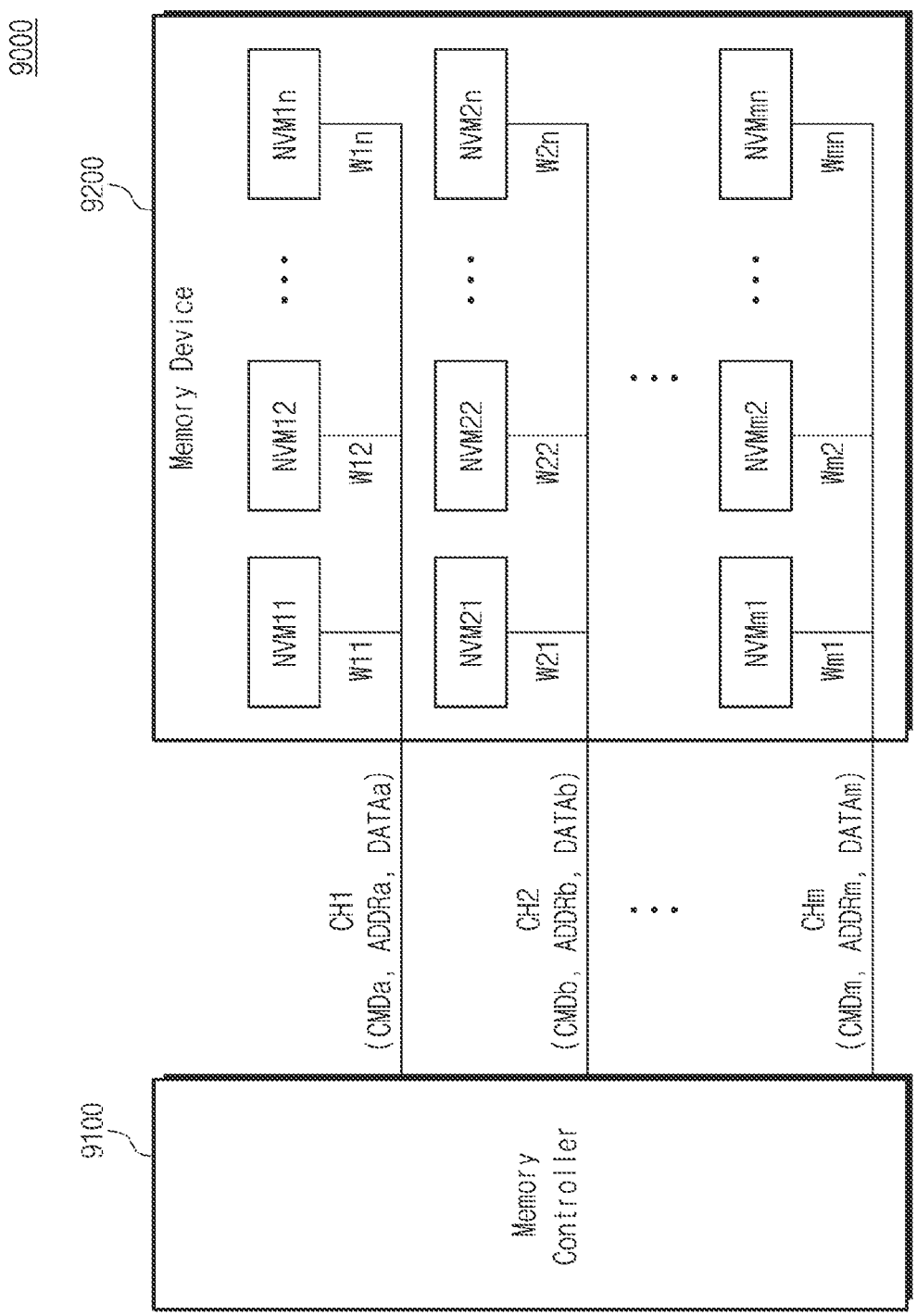
FIG. 9 is a block diagram of a storage system according to an embodiment of the present disclosure.

FIG. 9 is a block diagram of a storage system 9000 according to an embodiment of the present disclosure.

Referring to FIG. 9, the storage system 9000 may include a storage device 9200 and a memory controller 9100. The storage system 9000 may support multiple channels CH1 to CHM, and the storage device 9200 may be connected to the memory controller 9100 through multiple channels CH1 to CHM. For example, storage system 9000 may be implemented as a storage device, such as an SSD.

In some embodiments, the storage system 9000 may correspond to a storage device of at least one of FIGS. 2 to 6C. For example, the storage system 9000 may also include a micro controller unit (not shown). The micro controller unit may be a micro controller unit described with reference to at least one of FIGS. 2 to 6C.

The storage device 9200 may include a plurality of NVM devices NVM11 to NVMmn. Each of the NVM devices NVM11 to NVMmn can be connected to one of the plurality of channels CH1 to CHM through its corresponding path. For example, NVM devices NVM11 to NVM1n may be connected to the first channel CH1 through paths W11 to W1n, NVM devices NVM21 to NVM2n may be connected to the second channel CH2 through paths W21 to W2n, and NVM devices NVMm1 to NVMmn may be connected to the mth channel CHm through paths Wm1 to Wmn. In an example embodiment, each of the NVM devices NVM11 to NVM1n may be implemented as any storage element, which may operate according to a separate command from the memory controller 9100. For example, each of the NVM devices NVM11 to NVM1n may be implemented as a chip or die, but the present disclosure is not limited thereto.

The memory controller 9100 may send and receive signals to and from the storage device 9200 through the plurality of channels CH1 to CHM. For example, the memory controller 9100 may send commands CMDa to CMDm, addresses ADDRa to ADDRm, and data DATAa to DATAm to the storage device 9200 through channels CH1 to CHm, or receive data DATAa to DATAm from the storage device 9200.

The memory controller 9100 may select one from the NVM devices NVM11 to NVMmn connected to each of the channels CH1 to CHM by using the corresponding one of the channels CH1 to CHm and send and receive signals to and from the selected NVM device. For example, the memory controller 9100 may select the NVM device NVM11 from the NVM devices NVM11 to NVM1n connected to the first channel CH1. The memory controller 9100 can send the command CMDA, address ADDRa and data DATAa to the selected NVM device NVM11 through the first channel CH1, or receive data DATAa from the selected NVM device NVM11.

The memory controller 9100 may send and receive signals to and from the storage device 9200 in parallel through channels different from each other. For example, the memory controller 9100 may send the command CMDa to the storage device 9200 through the first channel CH1 and the command CMDb to the storage device 9200 through the second channel CH2. For example, the memory controller 9100 may receive data DATAa from the storage device 9200 through the first channel CH1 and data DATAb from the storage device 9200 through the second channel CH2.

The memory controller 9100 may control all operations of the storage device 9200. The memory controller 9100 may send signals to channels CH1 to CHM and control each of the NVM devices NVM11 to NVMmn connected to channels CH1 to CHm. For example, the memory controller 9100 may send a command CMDa and an address ADDRa to the first channel CH1 and control one selected from the NVM devices NVM11 to NVM1n.

Each of the NVM devices NVM11 to NVMmn can be operated via the control of the memory controller 9100. For example, the NVM device NVM11 may program the data DATAa based on the command CMDa, the address ADDRa, and the data DATAa provided to the first channel CH1. For example, the NVM device NVM21 may read the data DATAb based on the command CMDB and the address ADDRb provided to the second channel CH2 and send the read data DATAb to the memory controller 9100.

Although FIG. 9 shows an example in which the storage device 9200 communicates with the memory controller 9100 through M channels and includes N NVM devices corresponding to each channel, the number of channels and the number of NVM devices connected to one channel can be changed.

Figure 10:
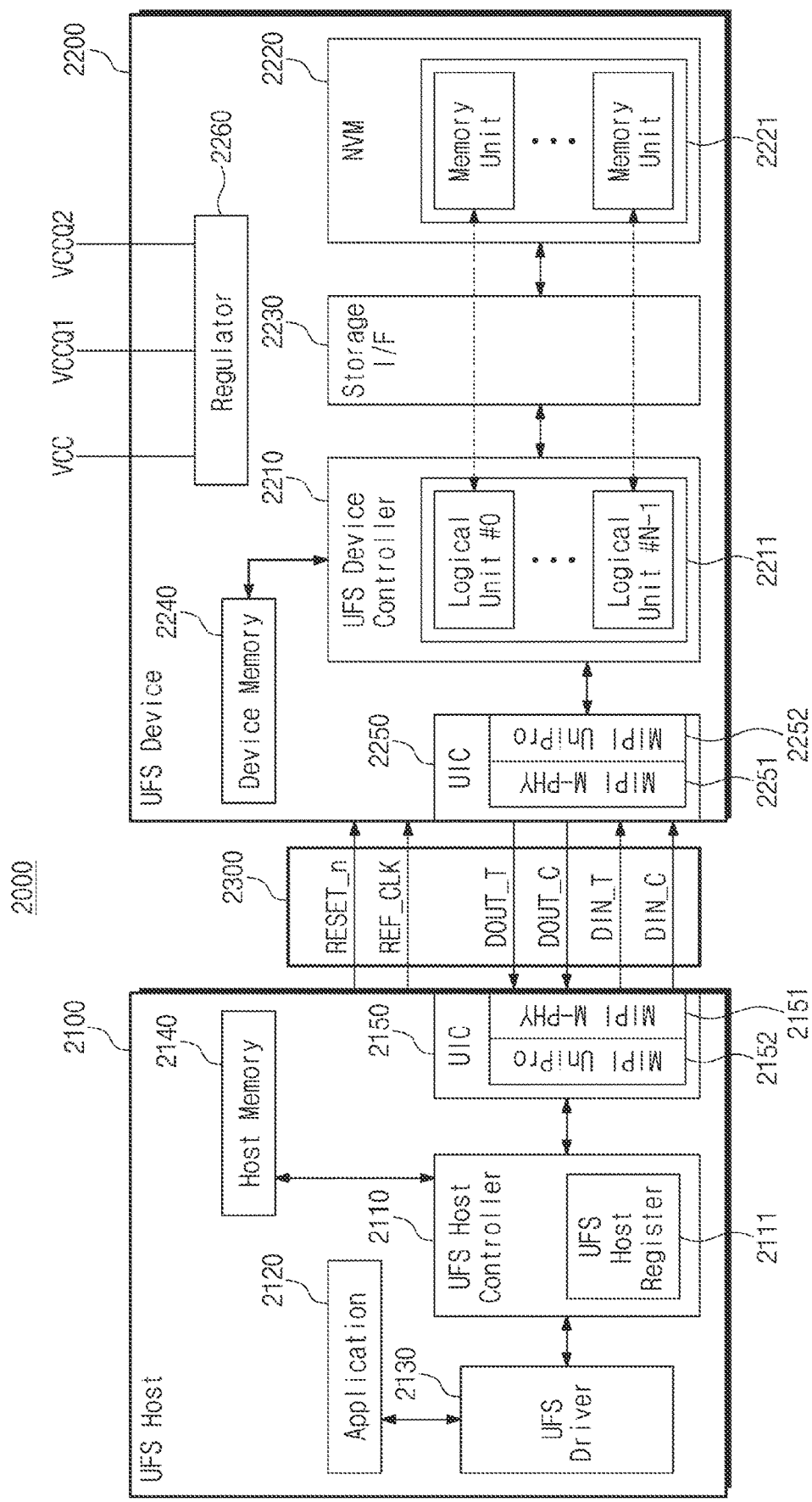
FIG. 10 is a diagram of a UFS system according to an embodiment.

FIG. 10 is a diagram of a UFS system 2000 according to an embodiment.

The UFS system 2000 may be a system conforming to a UFS standard announced by the Joint Electron Device Engineering Council (JEDEC) and include a UFS host 2100, a UFS device 2200, and a UFS interface 2300. The above description of the system 1000 of FIG. 7 may also be applied to the UFS system 2000 of FIG. 10 within a range that does not conflict with the following description of FIG. 10.

In some embodiments, the UFS host 2100 may include a baseboard management controller (not shown). For example, the UFS device 2200 may include a micro controller unit (not shown). The baseboard management controller may be a baseboard management controller described with reference to at least one of FIGS. 2 to 6C, and the micro controller unit may be a micro controller unit described with reference to at least one of FIGS. 2 to 6C.

Referring to FIG. 10, the UFS host 2100 may be connected to the UFS device 2200 through the UFS interface 2300. When the main processor 1100 of FIG. 7 is an AP, the UFS host 2100 may be implemented as a portion of the AP. The UFS host controller 2110 and the host memory 2140 may respectively correspond to the controller 1120 of the main processor 1100 and the memories 1200*a* and 1200*b* of FIG. 7. The UFS device 2200 may correspond to the storage device 1300*a* and 1300*b* of FIG. 7, and a UFS device controller 2210 and an NVM 2220 may respectively correspond to the storage controllers 1310*a* and 1310*b* and the NVMs 1320*a* and 1320*b* of FIG. 7.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHz, 26 MHz, 38.4 MHz, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 10, a pair of lines configured to transmit a pair of differential input signals DIN_T and DIN_C may constitute a receiving lane and a pair of lines configured to transmit a pair of differential output signals DOUT_T and DOUT_C may constitute a transmission lane. Although one transmission lane and one receiving lane are illustrated in FIG. 10, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine (not shown) embedded therein. More specifically, the ECC engine may generate parity bits for write data to be written to the NVM 2220 and the generated parity bits may be stored in the NVM 2220 along with the write data. During the reading of data from the NVM 2220, the ECC engine may correct an error in read data by using the parity bits read from the NVM 2220 along with the read data and output error-corrected read data.

In addition, the UFS device controller 2210 may transmit user data, which is temporarily stored in the device memory 2240, to the UFS host 2100. In addition, the UFS device controller 2210 may further include an AES engine (not shown). The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array (not shown) and a control circuit (not shown) configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ1, and VCCQ2 may be applied as power supply voltages to the UFS device 2200. The voltage VCC may be a main power supply voltage for the UFS device 2200 and be in a range of 2.4 V to 3.6 V. The voltage VCCQ1 may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ1, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

Figure 11:
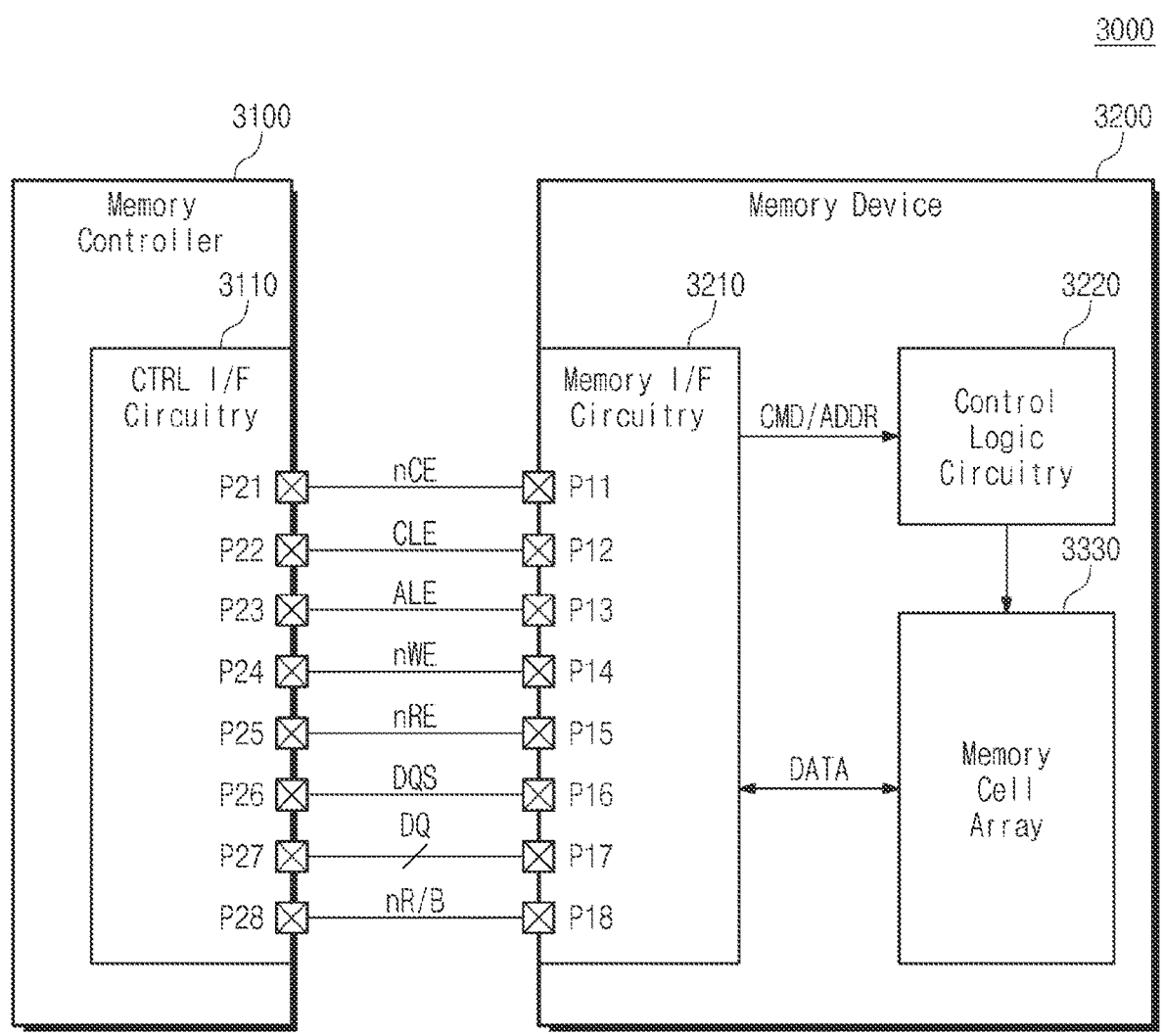
FIG. 11 is a block diagram of a storage system according to an embodiment of the present disclosure.

FIG. 11 is a block diagram of a storage system 3000 according to an embodiment of the present disclosure. Referring to FIG. 11, the storage system 3000 may include a storage device 3200 and a memory controller 3100. The storage device 3200 may correspond to one of the NVM devices NVM11 to NVMmn, which communicates with the memory controller 9100 based on one of the plurality of channels CH1 to CHm of FIG. 9. The memory controller 3100 may correspond to the memory controller 9100 of FIG. 9.

In some embodiments, the storage system 3000 may correspond to a storage device of at least one of FIGS. 2 to 6C. For example, the storage system 3000 may perform at least one out-of-band management method referring to FIGS. 1 to 6C using a micro controller unit (not shown).

The storage device 3200 may include first to eighth pins P11 to P18, a memory interface circuit 3210, a control logic circuit 3220, and a storage unit array 3330.

The memory interface circuit 3210 may receive the chip enable signal nCE from the memory controller 3100 through the first pin P11. The memory interface circuit 3210 may send and receive signals to and from the memory controller 3100 through the second to eighth pins P12 to P18 in response to the chip enable signal nCE. For example, when the chip enable signal nCE is in the enable state (e.g., low level), the memory interface circuit 3210 may send a signal to and receive a signal from the memory controller 3100 through the second to eighth pins P12 to P18.

The memory interface circuit 3210 may receive a command latch enable signal CLE, an address latch enable signal ALE, and a write enable signal nWE from the memory controller 3100 through the second to fourth pins P12 to P14. The memory interface circuit 3210 may receive the data signal DQ from the memory controller 3100 through the seventh pin P17 or send the data signal DQ to the memory controller 3100. Command CMD, address ADDR and data can be transmitted via data signal DQ. For example, the data signal DQ may be transmitted through a plurality of data signal lines. In this case, the seventh pin P17 may include a plurality of pins corresponding to a plurality of data signals DQ, respectively.

The memory interface circuit 3210 may obtain the command CMD from the data signal DQ received in the enable interval (e.g., high-level state) of the command latch enable signal CLE based on the switching time point of the write enable signal nWE. The memory interface circuit 3210 may obtain the address ADDR from the data signal DQ received in the enable interval (e.g., high-level state) of the address latch enable signal ALE based on the switching time point of the write enable signal nWE.

In an example embodiment, the write enable signal nWE may remain static (e.g., high level or low level) and switch between high level and low level. For example, the write enable signal nWE can be switched in the interval where the command CMD or address ADDR is sent. Therefore, the memory interface circuit 3210 can obtain the command CMD or address ADDR based on the switching time point of the write enable signal nWE.

The memory interface circuit 3210 may receive the read enable signal nRE from the memory controller 3100 through the fifth pin P15. The memory interface circuit 3210 may receive the data strobe signal DQS from the memory controller 3100 through the sixth pin P16 or may send the data strobe signal DQS to the memory controller 3100.

In the data (DATA) output operation of the storage device 3200, the memory interface circuit 3210 may receive the read enable signal nRE switched by the fifth pin P15 before outputting the data DATA. The memory interface circuit 3210 may generate a data strobe signal DQS, which is switched based on the switching of the read enable signal nRE. For example, the memory interface circuit 3210 may generate a data strobe signal DQS based on the switching start time of the read enable signal nRE, which starts switching after a predetermined delay (e.g., tDQSRE). The memory interface circuit 3210 may transmit a data signal DQ including data DATA based on the switching time point of the data strobe signal DQS. Therefore, the data DATA can be aligned with the switching time point of the data strobe signal DQS and transmitted to the memory controller 3100.

In the data (DATA) input operation of the storage device 3200, when the data signal DQ including data DATA is received from the memory controller 3100, the memory interface circuit 3210 may receive the switched data strobe signal DQ and data DATA. The memory interface circuit 3210 may obtain data DATA from the data signal DQ based on the switching time point of the data strobe signal DQS. For example, the memory interface circuit 3210 may sample the data signal DQ at the rising and falling edges of the data strobe signal DQS and obtain data DATA.

The memory interface circuit 3210 can send the ready/busy output signal nR/B to the memory controller 3100 through the eighth pin P18. The memory interface circuit 3210 may transmit the status information of the storage device 3200 to the memory controller 3100 through the ready/busy output signal nR/B. When the storage device 3200 is in a busy state (i.e., when an operation is being performed in the storage device 3200), the memory interface circuit 3210 may send a ready/busy output signal nR/B indicating the busy state to the memory controller 3100. When the storage device 3200 is in the ready state (i.e., when no operation is performed or completed in the storage device 3200), the memory interface circuit 3210 may send the ready/busy output signal nR/B indicating the ready state to the memory controller 3100. For example, when the storage device 3200 reads data from the storage unit array 3330 in response to a page reading command, the memory interface circuit 3210 may send a ready/busy output signal nR/B indicating a busy state (e.g., low level) to the memory controller 3100. For example, when the storage device 3200 programs the data DATA to the storage unit array 3330 in response to the programming command, the memory interface circuit 3210 may send the ready/busy output signal nR/B indicating the busy state to the memory controller 3100.

The control logic 3220 may control all operations of the storage device 3200. The control logic circuit 3220 may receive a command/address CMD/ADDR obtained from the memory interface circuit 3210. The control logic 3220 may generate control signals for controlling other components of the storage device 3200 in response to the received command/address CMD/ADDR. For example, the control logic circuit 3220 may generate various control signals for programming data DATA to or reading data DATA from the storage unit array 3330.

The storage unit array 3330 may store the data DATA obtained from the memory interface circuit 3210 via the control of the control logic circuit 3220. The storage unit array 3330 may output the stored data DATA to the memory interface circuit 3210 via the control of the control logic circuit 3220.

The storage unit array 3330 may include a plurality of storage units. For example, a plurality of storage units may be flash memory units. However, the present disclosure is not limited to this and the storage unit may be an RRAM unit, an FRAM unit, a PRAM unit, a thyristor RAM (TRAM) unit, or an MRAM unit. Hereinafter, an embodiment in which the storage unit is a NAND flash memory unit will be mainly described.

The memory controller 3100 may include first to eighth pins P21 to P28 and a controller interface circuit 3110. The first to eighth pins P21 to P28 may correspond to the first to eighth pins P11 to P18 of the storage device 3200, respectively.

The controller interface circuit 3110 may send the chip enable signal nCE to the storage device 3200 through the first pin P21. The controller interface circuit 3110 may send a signal to and receive a signal from the storage device 3200 through the second to eighth pins P22 to P28, wherein the storage device 3200 is selected by the chip enable signal nCE.

The controller interface circuit 3110 may send the command latch enable signal CLE, the address latch enable signal ALE, and the write enable signal nWE to the storage device 3200 through the second to fourth pins P22 to P24. The controller interface circuit 3110 may send or receive the data signal DQ to or from the storage device 3200 through the seventh pin P27.

The controller interface circuit 3110 may transmit the data signal DQ including the command CMD or address ADDR and the switched write enable signal nWE to the storage device 3200. The controller interface circuit 3110 may transmit the data signal DQ including the command CMD to the storage device 3200 by transmitting the command latch enable signal CLE with the enable state. Moreover, the controller interface circuit 3110 may transmit the data signal DQ including the command CMD to the storage device 3200 through an address latch enable signal ALE having an enable state is transmitted to transmit a data signal DQ including an address ADDR to the storage device 3200.

The controller interface circuit 3110 may send the read enable signal nRE to the storage device 3200 through the fifth pin P25. The controller interface circuit 3110 may receive the data strobe signal DQS from the storage device 3200 or send the data strobe communication signal DQS to the storage device 3200 through the sixth pin P26.

In the data (DATA) output operation of the storage device 3200, the controller interface circuit 3110 may generate a switched read enable signal nRE and send the read enable signal nRE to the storage device 3200. For example, before outputting the data DATA, the controller interface circuit 3110 may generate a read enable signal nRE from a static state (e.g., high level or low level). Therefore, the storage device 3200 can generate the switched data strobe signal DQS based on the read enable signal nRE. The controller interface circuit 3110 can receive the data signal DQ including data DATA and the switched data strobe signal DQS from the storage device 3200. The controller interface circuit 3110 can obtain data DATA from the data signal DQ based on the switching time point of the data strobe signal DQS.

During the data (DATA) input operation of the storage device 3200, the controller interface circuit 3110 may generate a switched data strobe signal DQS. For example, before transmitting the data DATA, the controller interface circuit 3110 may generate a data strobe signal DQS from a static state (e.g., high level or low level), which may transmit the data signal DQ including the data DATA to the storage device 3200 based on the switching time point of the data strobe signal DQS.

The controller interface circuit 3110 may receive the ready/busy output signal NR/B from the storage device 3200 through the eighth pin P28. The controller interface circuit 3110 may determine the status information of the storage device 3200 based on the ready/busy output signal nR/B.

Figure 12:
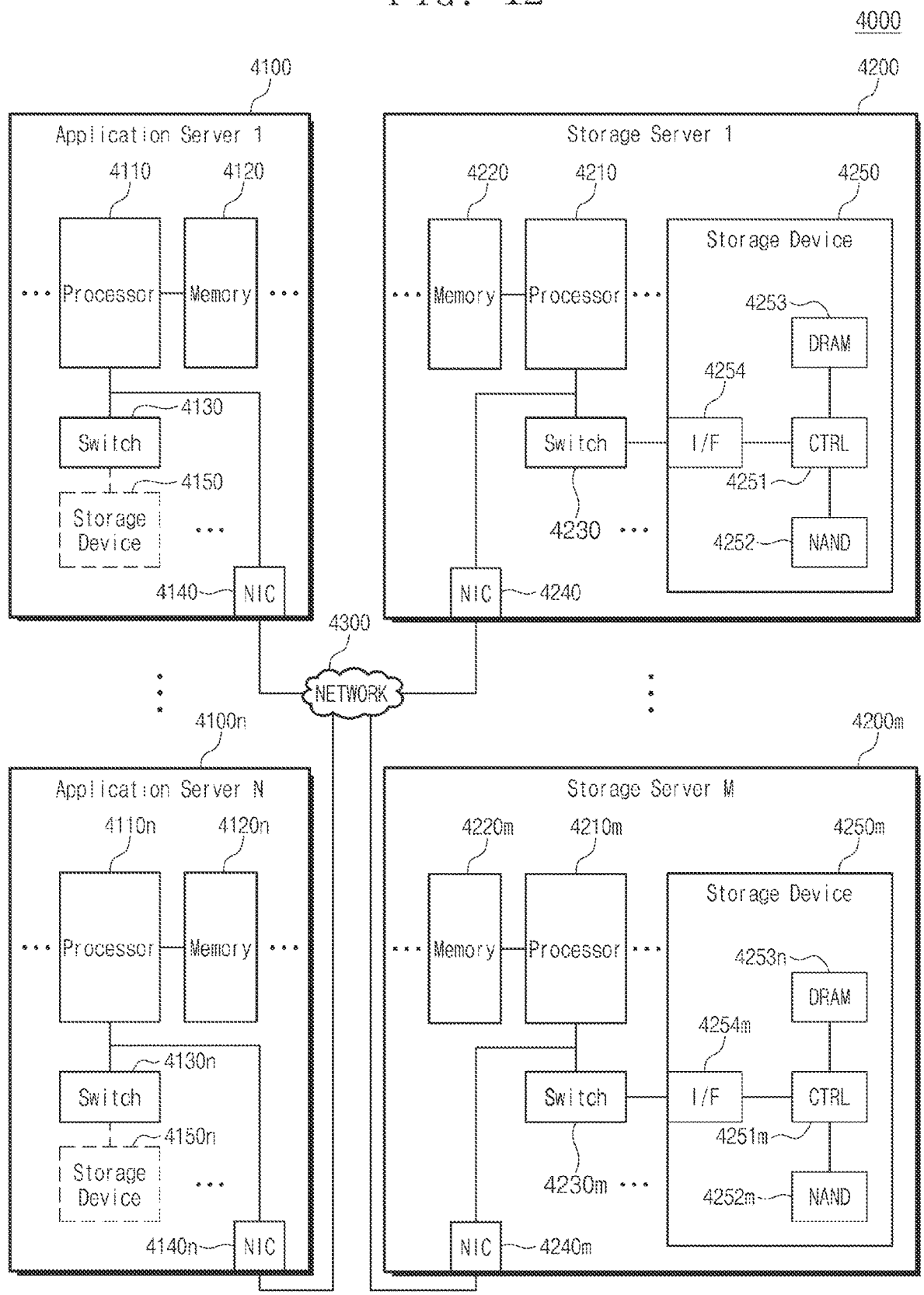
FIG. 12 is a block diagram of a data center to which a storage device is applied according to an embodiment of the present disclosure.

FIG. 12 is a block diagram of a data center 4000 to which a storage device is applied according to an embodiment of the present disclosure.

Referring to FIG. 12, the data center 4000 may be a facility for collecting various types of data and providing services and is referred to as a data storage center. The data center 4000 may be a system for operating search engines and databases and may be a computing system used by companies (such as banks) or government agencies. The data center 4000 may include application servers 4100 to 4100*n* and storage servers 4200 to 4200*m*. According to an embodiment, the number of applications 4100 to 4100*n* and the number of storage servers 4200 to 4200*m* can be selected differently. The number of application servers 4100 to 4100*n* and the number of storage servers 4200 to 4200*m* may be different from each other.

In some embodiments, the storage server 4200 and/or the application server 4100 may perform at least one out-of-band management method referring to FIGS. 1 to 6C using a baseboard management controller (not shown) and/or a micro controller unit (not shown).

The application server 4100 or the storage server 4200 may include processors 4110 and 4210 and at least one of memories 4120 and 4220. The storage server 4200 will now be described as an example. The processor 4210 may control all operations of the storage server 4200, access the memory 4220, and execute instructions and/or data loaded into the memory 4220. The memory 4220 may be a dual data rate synchronous DRAM (DDR SDRAM), a high bandwidth memory (HBM), a hybrid memory cube (HMC), a dual in-line memory module (DIMM), an optane DIMM, or a nonvolatile DIMM (NVMDIMM). In some embodiments, the number of processors 4210 and memory 4220 included in the storage server 4200 may be selected differently. In one embodiment, processor 4210 and memory 4220 may provide a processor-memory pair. In one embodiment, the number of processors 4210 and the number of memories 4220 may be different from each other. The processor 4210 may include a single core processor or a multi-core processor. The above description of the storage server 4200 can be similarly applied to the application server 4100. In some embodiments, the application server 4100 may not include a storage device 4150. The storage server 4200 may include at least one storage device 4250. According to an embodiment, the number of storage devices 4250 included in the storage server 4200 may be selected differently.

Application servers 4100 to 4100*n* can communicate with storage servers 4200 to 4200*m* through network 4300. The network 4300 may be implemented by using fibre channel (FC) or Ethernet. In this case, FC can be a medium for relatively high-speed data transmission and optical switches with high performance and high availability can be used. According to the access method of the network 4300, the storage servers 4200 to 4200*m* can be set as file storage, block storage, or object storage.

In one embodiment, the network 4300 may be a network dedicated to storage, such as a storage area network (SAN). For example, a SAN can be an FC-SAN that uses an FC network and is implemented according to the FC protocol (FCP). As another example, the SAN may be an Internet Protocol (IP)-SAN, which uses a transmission control protocol (TCP)/IP network and is implemented according to SCSI over TCP/IP or Internet SCSI (iSCSI) protocol. In another embodiment, the network 4300 may be a general-purpose network, such as a TCP/IP network. For example, the network 4300 may be implemented according to protocols such as FC (FCoE) over Ethernet, network attached storage (NAS), and fabric NVMe (NVMe-of).

Hereinafter, the application server 4100 and the storage server 4200 will be mainly described. The description of the application server 4100 may be applied to another application server 4100*n*, and the description of the storage server 4200 may be applied to another storage server 4200*m*.

The application server 4100 may store the data requested to be stored by the user or the client in one of the storage servers 4200 to 4200*m* through the network 4300. In addition, the application server 4100 can obtain data requested to be read by a user or a client from one of the storage servers 4200 to 4200*m* through the network 4300. For example, the application server 4100 may be implemented as a network server or a database management system (DBMS).

The application server 4100 may access the memory 4120*n* or the storage device 4150*n* included in another application server 4100*n* through the network 4300. Alternatively, the application server 4100 may access the memories 4220 to 4220*m* or storage devices 4250 to 4250*m* included in the storage servers 4200 to 4200*m* through the network 4300. Therefore, the application server 4100 may perform various operations on the data stored in the application servers 4100 to 4100*n* and/or the storage servers 4200 to 4200*m*. For example, the application server 4100 may execute instructions for moving or copying data between the application servers 4100 to 4100*n* and/or the storage servers 4200 to 4200*m*. In this case, data may be moved from the storage devices 4250 to 4250*m* of the storage servers 4200 to 4200*m* through the memories 4220 to 4220*m* of the storage servers 4200 to 4200*m* or directly to the memories 4120 to 4120*n* of the application servers 4100 to 4100*n*. The data moved through the network 4300 may be data encrypted for security or privacy.

The storage server 4200 will now be described as an example. The interface 4254 may provide a physical connection between the processor 4210 and the controller 4251 and a physical connection between the network interface card (NIC) 4240 and the controller 4251. For example, the interface 4254 may be implemented using a direct attached storage (DAS) scheme, where the storage device 4250 is directly connected to a dedicated cable. For example, interface 4254 can be implemented by using various interface schemes, such as ATA, SATA, E-SATA, SCSI, SAS, PCI, PCIe, NVMe, IEEE 1394, USB interface, SD card interface, MMC interface, eMMC interface, UFS interface, eUFS interface and CF card interface.

The storage server 4200 may further include a switch 4230 and a network interconnect (NIC) 4240. The switch 4230 may selectively connect the processor 4210 to the storage device 4250 via the control of the processor 4210, or selectively connect the NIC 4240 to the storage device 4250. A corresponding switch 4130 and NIC 4140 are disposed in application server 4100 to operate in a similar manner.

In one embodiment, NIC 4240 may include a network interface card and a network adapter. NIC 4240 can be connected to network 4300 through wired interface, wireless interface, Bluetooth interface, or optical interface. The NIC 4240 may include an internal memory, a digital signal processor (DSP), and a host bus interface and is connected to the processor 4210 and/or the switch 4230 through the host bus interface. The host bus interface may be implemented as one of the above examples of interface 4254. In one embodiment, NIC 4240 may be integrated with at least one of processor 4210, switch 4230, and storage device 4250.

In storage servers 4200 to 4200*m* or application servers 4100 to 4100*n*, the processor may send commands to storage devices 4150 to 4150*n* and 4250 to 4250*m* or memories 4120 to 4120*n* and 4220 to 4220*m* and program or read data. In this case, the data can be the wrong data corrected by the ECC engine. The data may be data on which a data bus inversion (DBI) operation or a data masking (DM) operation is performed and may include cyclic redundancy coding (CRC) information. Data can be encrypted for security or privacy.

The storage devices 4150 to 4150*n* and 4250 to 4250*m* may send control signals and command/address signals to the NAND flash memory devices 4252 to 4252*m* in response to a read command received from the processor. Therefore, when reading data from the NAND flash memory devices 4252 to 4252m, the read enable (RE) signal can be input as the data output control signal. Therefore, the data can be output to the DQ bus. The RE signal can be used to generate the data strobe signal DQS. Depending on the rising or falling edge of the write enable (WE) signal, the command and address signals can be locked in the page buffer.

The controller 4251 may control all operations of the storage device 4250. In one embodiment, the controller 4251 may include an SRAM. The controller 4251 may write data to the NAND flash memory device 4252 in response to a write command or read data from the NAND flash memory device 4252 in response to a read command. For example, write commands and/or read commands may be provided from processor 4210 of storage server 4200, processor 4210m of another storage server 4200m, or processors 4110 and 4110n of application servers 4100 and 4100n. The DRAM 4253 may temporarily store (or buffer) data to be written to or read from the NAND flash memory device 4252. Also, DRAM 4253 can store metadata. Here, the metadata may be user data or data generated by the controller 4251 for managing the NAND flash memory device 4252. The storage device 4250 may include a security element (SE) for security or privacy.

In the out-of-band management method for the baseboard management controller and the storage apparatus according to the example embodiment of the present disclosure, the baseboard management controller may control the operation of the storage apparatus based on the information received from the micro controller unit, thus enhancing the management function of the storage apparatus by the baseboard management controller (e.g., out-of-band management functions).

In the out-of-band management method for the baseboard management controller and the storage apparatus according to the example embodiment of the present disclosure, the baseboard management controller may communicate with the micro controller unit under abnormal conditions of the storage apparatus. Therefore, the control ability of the baseboard management controller to the storage apparatus can be improved when the state of the storage apparatus is abnormal.

In the out-of-band management method for the baseboard management controller and the storage apparatus according to the example embodiment of the present disclosure, the baseboard management controller may communicate with the micro controller unit based on an internal integrated circuit bus or a system management bus. Therefore, the baseboard management controller can efficiently communicate with the micro controller unit.

In the out-of-band management method for the baseboard management controller and the storage apparatus according to the example embodiment of the present disclosure, since the micro controller unit can send at least one of the status information of the storage apparatus and the product information of the storage apparatus to the external baseboard management controller, the out-of-band management function for the storage apparatus is enhanced.

In the out-of-band management method for the baseboard management controller and the storage apparatus according to the example embodiment of the present disclosure, the micro controller unit may include a persistent memory used to store at least one of the status information of the storage apparatus and the product information of the storage apparatus. Therefore, at least one of the state information of the storage apparatus and the product information of the storage apparatus can be reliably stored in the micro controller unit.

In the out-of-band management method for the baseboard management controller and the storage apparatus according to the example embodiment of the present disclosure, the baseboard management controller can receive information from the micro controller unit through out-of-band management, so the ability to collect information from the storage apparatus is extended.

In the out-of-band management method for the baseboard management controller and the storage apparatus according to the example embodiment of the present disclosure, the baseboard management controller can control the operation of the storage apparatus based on the information received from the micro controller unit through out-of-band management, so the control ability of the storage apparatus is enhanced.

In the out-of-band management method for the baseboard management controller and the storage apparatus according to the example embodiment of the present disclosure, since a persistent memory for storing various information of the storage apparatus (e.g., at least one of vital product data, software information, and hardware information of the storage apparatus) is set in the micro controller unit, the micro controller unit can send various information to the baseboard management controller through out-of-band management, so as to enhance and expand the out-of-band management capability of the storage apparatus.

In the out-of-band management method for the baseboard management controller and the storage apparatus according to the example embodiment of the present disclosure, the communication capability between the baseboard management controller and the micro controller unit can be enhanced by realizing the software communication protocol stack between the baseboard management controller and the micro controller unit, so that more messages and commands can be sent between them, so as to enhance and expand the out-of-band management ability of the baseboard management controller to the storage apparatus, and so that the baseboard management controller can better monitor and manage the storage apparatus. For example, when the baseboard management controller detects an abnormal power failure of the host, the baseboard management controller can send a message to the storage apparatus through out-of-band management to make the storage apparatus take countermeasures. This can ensure data integrity and prevent data loss.

In the out-of-band management method for the baseboard management controller and the storage apparatus according to the example embodiment of the present disclosure, since the microcontroller is configured with a persistent memory to store any kind of information, the electrically erasable programmable read-only memory can be removed from the storage apparatus. Therefore, space on the main board of the storage apparatus is saved and the cost of the storage apparatus is reduced.

In the out-of-band management method for the baseboard management controller and the storage apparatus according to the example embodiment of the present disclosure, since one of the power supply unit and the standby power supply can be used to supply power to the micro controller unit, stable out-of-band management can be realized.

In the out-of-band management method for the baseboard management controller and the storage apparatus according to the example embodiment of the present disclosure, when the main controller of the storage apparatus is in an abnormal state and cannot perform in-band communication, the baseboard management controller can communicate with the storage apparatus through the out-of-band management mode according to the example embodiment of the present disclosure, can obtain the information before and after the error of the main controller of the storage apparatus (for example, only as an example, hardware monitoring information, log information, etc.), and use the information for fault analysis so as to quickly locate the cause of the fault and repair the fault. Effectively reducing the failure time can greatly reduce the production loss and cost caused by storage equipment failure in industrial production.

In the out-of-band management method for the baseboard management controller and the storage apparatus according to the example embodiment of the disclosure, the internal hardware information of the storage apparatus can be collected through the baseboard management controller and stored in the persistent memory of the micro controller unit and then the baseboard management controller communicates with the micro controller unit through out-of-band management, which solves the problem that when the main controller of the storage apparatus is in an abnormal state, the host cannot monitor the internal hardware of the storage apparatus.

According to one or more example embodiments, the above-described processor may be implemented using a combination of hardware, hardware and software, or a non-transitory storage medium storing executable software for performing its functions.

Hardware may be implemented using processing circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., one or more processors, CPUs, controllers, ALUs, DSPs, microcomputers, microprocessors, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor. In another example, the hardware device may be an integrated circuit customized into special purpose processing circuitry (e.g., an ASIC).

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Software and/or data may be embodied permanently or temporarily in any type of storage media including, but not limited to, any machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including tangible or non-transitory computer-readable storage media as discussed herein.

Storage media may also include one or more storage devices as units and/or devices according to one or more example embodiments. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the storage media, the computer programs, program code, instructions, or some combination thereof, may be specially designed and constructed for the purposes of the example embodiments, or they may be known devices that are altered and/or modified for the purposes of example embodiments.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of example embodiments of the present disclosure. Accordingly, all such modifications are intended to be included within the scope of example embodiments of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An out-of-band management method of a storage apparatus, the method comprising:
   communicating, by a host device, with a main controller unit included in the storage apparatus through in-band communication, wherein the main controller unit comprises a processor configured to control data write and read operations on a storage of the storage apparatus, wherein the host device is distinct from the storage apparatus and is configured to manage operation of the storage apparatus;
   communicating, by a baseboard management controller included in the host device, with a micro controller unit included in the storage apparatus through out-of-band communication, to obtain information comprising at least one of product information of the storage apparatus or status information of the storage apparatus, wherein the micro controller unit is distinct from the main controller unit, and wherein the micro controller unit is configured to implement a software communication protocol stack to communicate with the baseboard management controller;
   operating the storage apparatus, by the baseboard management controller, based on the obtained information; and
   supplying, by the host device, a first voltage to the main controller unit and a second voltage to the micro controller unit, wherein the first voltage is different from the second voltage.

2. The out-of-band management method of claim 1, wherein:
   the product information includes vital product data information, and
   the status information includes at least one of voltage information, humidity information, temperature information, current information, fan status information, or power status information.

3. The out-of-band management method of claim 1, wherein the operating the storage apparatus includes:
   sending, by the baseboard management controller, information for operating the storage apparatus to the micro controller unit, in response to the obtained information indicating that the storage apparatus is in an abnormal state.

4. The out-of-band management method of claim 1, wherein the baseboard management controller is configured to communicate with the micro controller unit based on an internal integrated circuit bus or a system management bus.

5. The out-of-band management method of claim 1, wherein the storage of the storage apparatus comprises a non-volatile memory, and
   wherein the processor of the main controller unit is configured to control data write and read operations on the non-volatile memory by executing a flash conversion layer loaded in a working memory of the main controller unit.

6. A host device comprising:
   a baseboard management controller comprising a communication unit, wherein the communication unit is configured to communicate with a micro controller unit of a storage apparatus through out-of-band communication, to obtain information comprising product information of the storage apparatus and status information of the storage apparatus;
   a central processing unit configured to communicate with a main controller unit of the storage apparatus through in-band communication, wherein the micro controller unit is distinct from the main controller unit;
   an operation unit configured to operate the storage apparatus based on the obtained information;
   a first power supply unit configured to supply a first voltage to the main controller unit; and
   a second power supply unit configured to supply a second voltage to the micro controller unit, wherein the first voltage is different from the second voltage.

7. The host device of claim 6, wherein:
   the product information includes vital product data information, and
   the status information includes at least one of voltage information, humidity information, temperature information, current information, fan status information, or power status information.

8. The host device of claim 6, wherein the communication unit is configured to send information for operating the storage apparatus to the micro controller unit, in response to the obtained information indicating that the storage apparatus is in an abnormal state.

9. The host device of claim 6, wherein the communication unit is configured to communicate with the micro controller unit based on an internal integrated circuit bus or a system management bus.

10. A storage device comprising:
a main controller unit configured to communicate with a central processing unit included in an external host through in-band communication,
wherein the storage device is distinct from the external host and is configured to be managed by the external host;
a micro controller unit configured to communicate with a baseboard management controller included in the external host through out-of-band communication, wherein the main controller unit is distinct from the micro controller unit; and
a storage,
wherein the main controller unit comprises a processor configured to control data write and read operations on the storage,
wherein the micro controller unit is configured to implement a software communication protocol stack to communicate with the baseboard management controller,
wherein the main controller unit is configured to receive a first power supply voltage from the external host,
wherein the micro controller unit is configured to receive a second power supply voltage from the external host, and
wherein the first power supply voltage is different from the second power supply voltage.

11. The storage device of claim 10, wherein the micro controller unit is configured to communicate product information and status information of the storage device to the baseboard management controller through the out-of-band communication.

12. The storage device of claim 11, wherein the status information includes at least one of voltage information, humidity information, temperature information, current information, fan status information, or power status information.

13. The storage device of claim 11, wherein the baseboard management controller is configured to transmit information for operating the storage device to the micro controller unit, in response to the status information indicating that the storage device is in an abnormal state.

14. The storage device of claim 11, wherein the micro controller unit is configured to receive information for operating the storage device from the baseboard management controller based on the status information or the product information.

15. The storage device of claim 11, wherein the micro controller unit comprises a persistent memory which stores the state information and the product information.

* * * * *